United States Patent
Na et al.

(10) Patent No.: US 11,422,609 B2
(45) Date of Patent: Aug. 23, 2022

(54) ELECTRONIC DEVICE AND METHOD FOR CONTROLLING OPERATION OF DISPLAY IN SAME

(71) Applicant: Samsung Electronics Co., Ltd., Gyeonggi-do (KR)

(72) Inventors: Shinyoung Na, Gyeonggi-do (KR); Wonhee Lee, Gyeonggi-do (KR); Kyusung Kim, Gyeonggi-do (KR); Jongjin Kim, Gyeonggi-do (KR); Yoomi Tak, Gyeonggi-do (KR); Sangmin Hwang, Gyeonggi-do (KR)

(73) Assignee: Samsung Electronics Co., Ltd.

( * ) Notice: Subject to any disclaimer, the term of this patent is extended or adjusted under 35 U.S.C. 154(b) by 0 days.

(21) Appl. No.: 16/794,924

(22) Filed: Feb. 19, 2020

(65) Prior Publication Data
US 2020/0264684 A1 Aug. 20, 2020

(30) Foreign Application Priority Data
Feb. 19, 2019 (KR) .......... 10-2019-0019524

(51) Int. Cl.
| | |
|---|---|
| G06F 3/00 | (2006.01) |
| G06F 1/3218 | (2019.01) |
| G06F 1/3234 | (2019.01) |
| G06F 3/01 | (2006.01) |
| G06F 3/041 | (2006.01) |
| H04M 1/02 | (2006.01) |

(52) U.S. Cl.
CPC .......... *G06F 1/3218* (2013.01); *G06F 1/3265* (2013.01); *G06F 3/017* (2013.01); *G06F 3/0412* (2013.01); *H04M 1/0266* (2013.01)

(58) Field of Classification Search
None
See application file for complete search history.

(56) References Cited

U.S. PATENT DOCUMENTS

| | | | |
|---|---|---|---|
| 10,101,793 B2 * | 10/2018 | Tu | ............ G06F 1/3218 |
| 2004/0017300 A1 | 1/2004 | Kotzin et al. | |
| 2010/0167794 A1 | 7/2010 | Yin | |

(Continued)

FOREIGN PATENT DOCUMENTS

| | | |
|---|---|---|
| CN | 109582197 | 4/2019 |
| KR | 10-2014-0034615 | 3/2014 |
| KR | 10-2014-0137189 | 12/2014 |

OTHER PUBLICATIONS

International Search Report dated Jun. 4, 2020 issued in counterpart application No. PCT/KR2020/002345, 9 pages.

*Primary Examiner* — Michael A Faragalla
(74) *Attorney, Agent, or Firm* — The Farrell Law Firm, P.C.

(57) ABSTRACT

An electronic device and a method of operating an electronic device are provided. The electronic device includes a display; a motion sensor; and a processor, wherein the processor is configured to determine a first state associated with a user using the motion sensor while performing a call mode; if a predefined state is detected from the first state, configure an algorithm for determining a second state, based on the first state; determine the second state using the motion sensor, based on the configured algorithm; and control the operation of the display, based on a result of determining the second state.

20 Claims, 12 Drawing Sheets

(56) References Cited

U.S. PATENT DOCUMENTS

| | | | |
|---|---|---|---|
| 2014/0204044 A1* | 7/2014 | Mak-Fan | G06F 3/0416 |
| | | | 345/173 |
| 2015/0264170 A1* | 9/2015 | Lockwood | H04M 1/0202 |
| | | | 455/418 |
| 2016/0085314 A1 | 3/2016 | Hong et al. | |
| 2019/0124197 A1* | 4/2019 | Zhou | H04M 1/72454 |

\* cited by examiner

ELECTRONIC DEVICE AND METHOD FOR CONTROLLING OPERATION OF DISPLAY IN SAME

CROSS-REFERENCE TO RELATED APPLICATION(S)

This application is based on and claims priority under 35 U.S.C. § 119 to Korean Patent Application No. 10-2019-0019524, filed on Feb. 19, 2019, in the Korean Intellectual Property Office, the disclosure of which is incorporated by reference herein in its entirety.

BACKGROUND

1. Field

The disclosure relates to a method for controlling an operation of a display in a call mode in an electronic device and an electronic device of executing the same.

2. Description of the Related Art

In recent years, electronic devices have employed various functions and have been implemented as multimedia players having complex functions such as, taking pictures or videos, playing music or video files, playing games, receiving broadcasts, or making a call. An electronic device may be equipped with a display, thereby displaying function-related screens, based on the display.

A current electronic device may include a proximity sensor provided in a portion on one side of the electronic device (e.g., a front surface on which a display is located). An electronic device may include a proximity sensor for detecting proximity of an object, and the structure and/or the software of the electronic device are being improved for functions based on the proximity sensor or to increase the functions thereof. For example, an electronic device may provide a function of easily controlling an operation of a display (e.g., on/off) during a call using a proximity sensor. For example, an electronic device may distinguish and/or determine a first case where the electronic device is in proximity to a user's ear and a second case where the electronic device is within a user's view (e.g., in front of the user's face (or eyes)) during a call, based on the proximity sensor, and may turn off the display in the first case and turn on the display in the second case. Accordingly, the electronic device may prevent malfunction due to a touch by the face or ear of the user during a call.

As described above, a conventional electronic device determines an operation of a display (e.g., on/off) only using a proximity sensor. In this case, if the proximity sensor located at the top of the electronic device is out of a user's ear, or if a black object (e.g., dark hair, dark skin, or the like) approaches the proximity sensor while the user is answering the call, the proximity sensor may fail to determine the proximity or release of an object. In addition, recent electronic devices have been implemented to have a proximity sensor mounted below a display (e.g., under a panel). In this case, a recognizable distance for determining proximity/release using a proximity sensor is reduced, so that the limitation of a conventional proximity sensor may be more prominent. For example, the reduction in the recognizable distance by the proximity sensor may cause more frequent malfunction than before in determining the proximity/release of an object in a normal situation, as well as in the case of a black object.

SUMMARY

An aspect of the present disclosure provides an electronic device for controlling an operation of a display (e.g., on/off) using a motion sensor (e.g., an acceleration sensor and/or a gyro sensor) during a call, thereby preventing malfunction caused by a touch, and a method thereof.

Another aspect of the present disclosure provides an electronic device that recognizes a situation using a motion sensor and a touch sensor and controls turning on/off a display according to a situation, in order to prevent malfunction caused by an unintended touch by a user during a call, and a method thereof.

Another aspect of the present disclosure provides an electronic device that recognizes a situation and a state (or posture or motion) using a motion sensor, instead of a proximity sensor, in order to identify the situation in which the electronic device is in contact with a user's ear during a call and the situation in which the electronic device is removed from the user's ear, thereby determining a time to turn on/off a display using a touch sensor together, and a method thereof.

Another aspect of the present disclosure provides an electronic device capable of supplementing (or replacing) an existing proximity sensor using a motion sensor and a touch sensor and more accurately recognizing a situation, as compared to the proximity sensor, when providing a function of preventing malfunction due to a touch during a call, and a method thereof.

According to an aspect of the present disclosure, an electronic device is provided. The electronic device includes a display; a motion sensor; and a processor, wherein the processor is configured to determine a first state associated with a user using the motion sensor while performing a call mode; if a predefined state is detected from the first state, configure an algorithm for determining a second state, based on the first state; determine the second state using the motion sensor, based on the configured algorithm; and control the operation of the display, based on a result of determining the second state.

According to another aspect of the present disclosure, a method of operating an electronic device is provided. The method includes determining a first state associated with a user using a motion sensor while performing a call mode; if a predefined state is detected from the first state, configuring an algorithm for determining a second state, based on the first state; determining the second state using the motion sensor, based on the configured algorithm; and controlling the operation of a display, based on a result of determining the second state.

BRIEF DESCRIPTION OF THE DRAWINGS

The above and other aspects, features, and advantages certain embodiments of the present disclosure will be more apparent from the following description taken in conjunction with the accompanying drawings, in which.

DETAILED DESCRIPTION

According to an electronic device and a method thereof in accordance with various embodiments, it is possible to prevent malfunction caused by a touch by controlling an operation of a display (e.g., on/off) using a motion sensor (e.g., an acceleration sensor and/or a gyro sensor) during a call. It is possible to prevent malfunction caused by an unintended touch of a user during a call by recognizing a situation and a state (or motion) during a call and controlling turning on/off a display according to a situation and/or a state using a motion sensor and a touch sensor. In order to identify a situation in which the user puts an electronic device in contact with the user's ear during a call and a situation in which the user removes the electronic device from the user's ear, a situation and/or a state may be recognized using a motion sensor, instead of a proximity sensor, thereby determining a time to turn on/off a display using a touch sensor together.

It is possible to supplement (or replace) an existing proximity sensor and to more accurately recognize a situation, as compared to a proximity sensor, using a motion sensor and a touch sensor when providing a function of preventing malfunction due to a touch during a call. It is possible to more accurately determine proximity status (e.g., proximity/release) using a motion sensor and a touch sensor even in a case where an electronic device is not capable to use a proximity sensor (e.g., degradation of performance of the proximity sensor and/or malfunction thereof), thereby increasing accuracy in preventing malfunction that may occur during a call and improving the convenience of a user according thereto.

Figure 1:
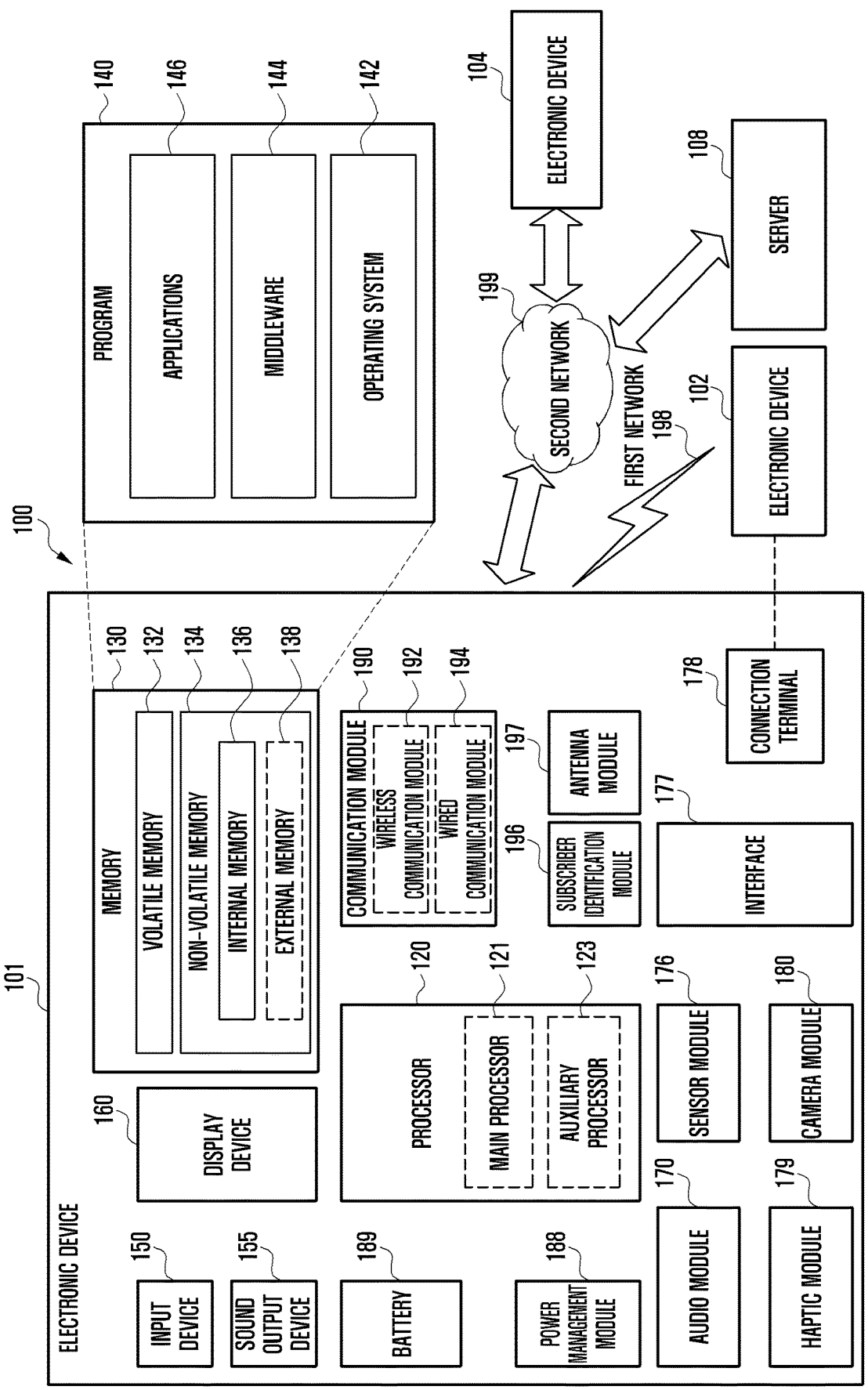
FIG. 1 illustrates an electronic device in a network environment according to an embodiment.

FIG. 1 illustrates an electronic device 101 in a network environment 100 according to an embodiment.

Referring to FIG. 1, the electronic device 101 in the network environment 100 may communicate with an electronic device 102 via a first network 198 (e.g., a short-range wireless communication network), with an electronic device 104 or a server 108 via a second network 199 (e.g., a long-range wireless communication network), or with the electronic device 104 via the server 108, and may include a processor 120, a memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) card 196, and an antenna module 197. At least one (e.g., the display device 160 or the camera module 180) of the components may be omitted from the electronic device 101, or one or more other components may be added in the electronic device 101. Some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. The processor 120 may load a command or data received from another component (e.g., the sensor module 176 or the communication module 190) in the volatile memory 132, process the command or the data stored in the volatile memory 132, and store resulting data in non-volatile memory 134. The processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). The auxiliary processor 123 (e.g., an ISP or a CP) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101 and may include software (e.g., the program 140) and input data or output data for a command related thereto. The memory 130 may include the volatile memory 132 or the non-volatile memory 134.

The program 140 may be stored in the memory 130 as software, and may include an operating system (OS) 142, middleware 144, or an application 146.

The input device 150 may receive a command or data to be used by another component (e.g., the processor 120) of the electronic device 101, from the outside (e.g., a user) of the electronic device 101, and may include a microphone, a mouse, a keyboard, or a digital pen (e.g., a stylus pen).

The sound output device 155 may output sound signals to the outside of the electronic device 101 and may include a speaker or a receiver. The speaker may be used for general purposes, such as playing multimedia or playing record, and the receiver may be used for incoming calls and may be implemented as separate from, or as part of the speaker.

The display device 160 may visually provide information to the outside (e.g., a user) of the electronic device 101 and may include a display, a hologram device, or a projector and control circuitry to control a corresponding one of the display, hologram device, and projector. The display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa, and may obtain the sound via the input device 150, or output the sound via the sound output device 155 or a headphone of an external electronic device (e.g., an electronic device 102) directly (e.g., over wires) or wirelessly coupled with the electronic device 101.

The sensor module 176 may detect an operational state (e.g., power or temperature) of the electronic device 101 or an environmental state (e.g., a state of a user) external to the electronic device 101, and generate an electrical signal or data value corresponding to the detected state, and may include a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., over wires) or wirelessly, and may include a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102), and may include a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation, and may include a motor, a piezoelectric element, or an electric stimulator.

The camera module 180 may capture a still image or moving images and may include one or more lenses, image sensors, ISPs, or flashes.

The power management module 188 may manage power supplied to the electronic device 101, and may be implemented as at least part of a power management integrated circuit (PMIC).

The battery 189 may supply power to at least one component of the electronic device 101, and may include a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more CPs that are operable independently from the processor 120 (e.g., the AP) and supports a direct (e.g., wired) communication or a wireless communication. The communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., a LAN or a wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101 and may include an antenna including a radiating element composed of a conductive material or a conductive pattern formed in or on a substrate (e.g., a PCB). The antenna module 197 may include a plurality of antennas. In such a case, at least one antenna appropriate for a communication scheme used in the communication network, such as the first network 198 or the second network 199, may be selected by the communication module 190 (e.g., the wireless communication module 192) from the plurality of antennas. The signal or the power may then be transmitted or received between the communication module 190 and the external electronic device via the selected at least one antenna. Another component (e.g., an RFIC) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

Commands or data may be transmitted or received between the electronic device 101 and the external electronic device 104 via the server 108 coupled with the second network 199. Each of the electronic devices 102 and 104 may be a device of a same type as, or a different type, from the electronic device 101.

All or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing, as at least part of a reply to the request. To that end, a cloud, distributed, or client-server computing technology may be used, for example.

The electronic device 101 according to embodiments may be one of various types of electronic devices, such as a portable communication device (e.g., a smartphone), a computer device, a portable multimedia device, a portable medical device, a camera, a wearable device, or a home appliance. However, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise.

As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., over wires), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 2A:
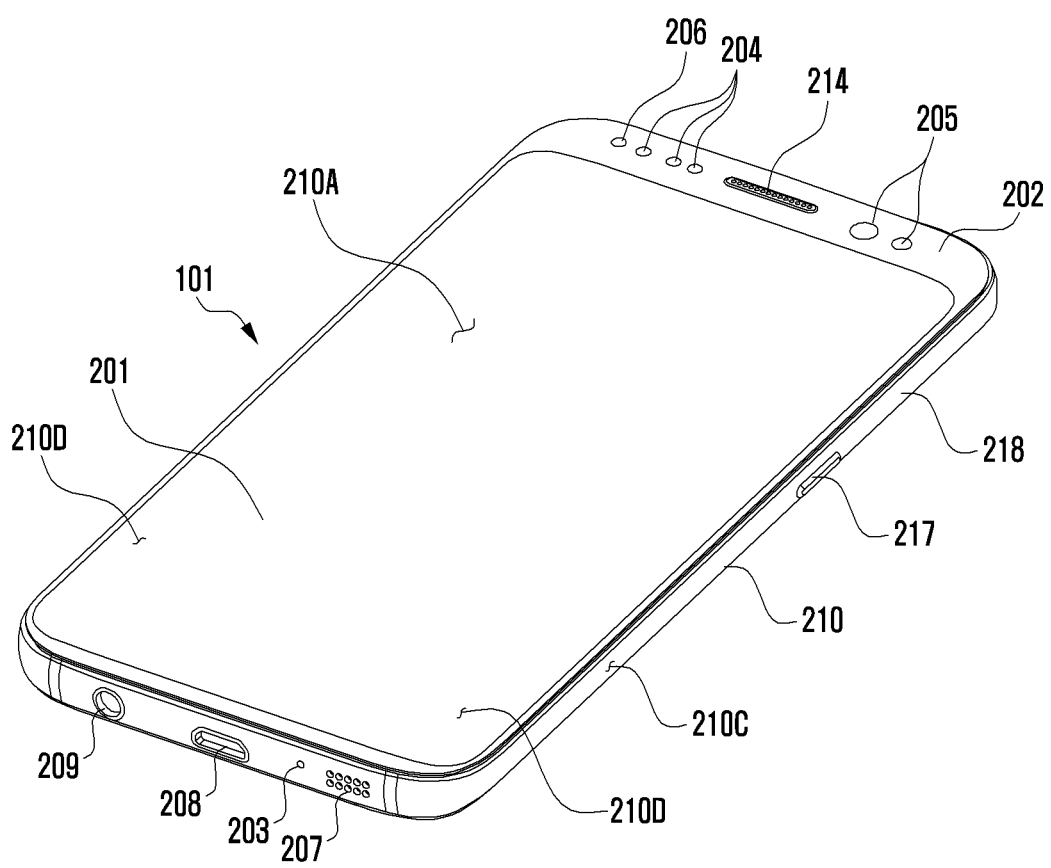
FIG. 2A is a perspective view of a front surface of an electronic device according to an embodiment.

FIG. 2A is a perspective view showing a front surface of an electronic device according to an embodiment.

Figure 2B:
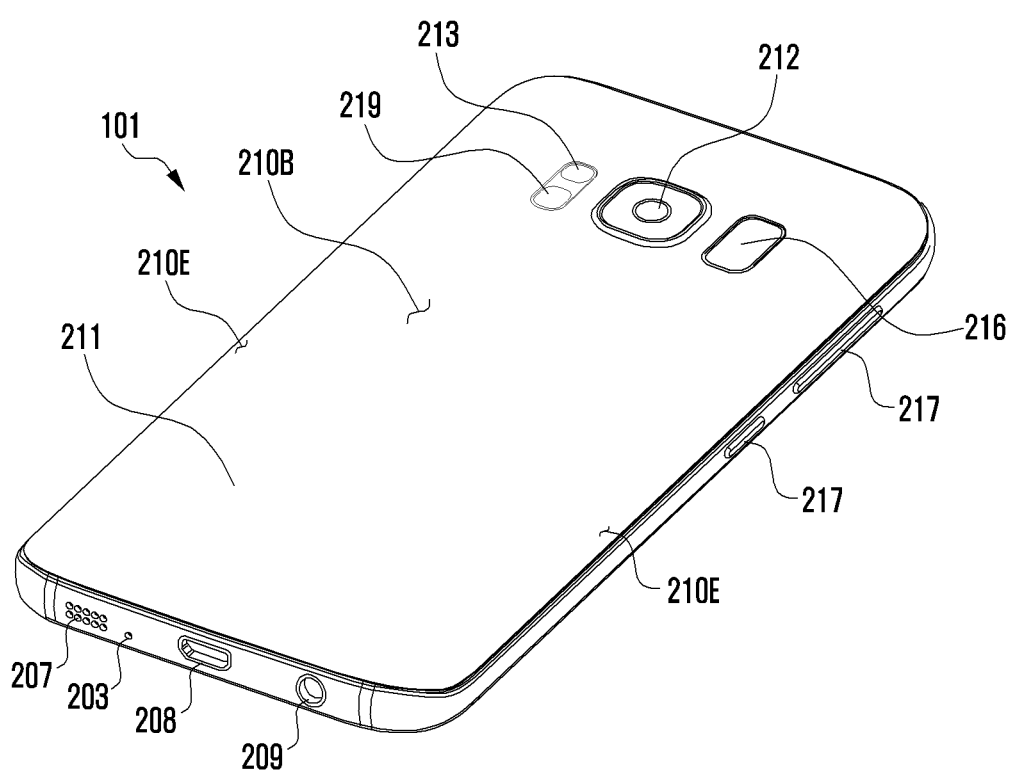
FIG. 2B is a perspective view of a rear surface of an electronic device shown in FIG. 1 according to an embodiment.

FIG. 2B is a perspective view showing a rear surface of an electronic device shown in FIG. 2A according to an embodiment.

Referring to FIGS. 2A and 2B, the electronic device 101 may include a housing 210 that includes a first surface (or front surface) 210A, a second surface (or rear surface) 210B, and a lateral surface 210C that surrounds a space between the first surface 210A and the second surface 210B. The housing 210 may refer to a structure that forms a part of the first surface 210A, the second surface 210B, and the lateral surface 210C. The first surface 210A may be formed of a front plate 202 (e.g., a glass plate or polymer plate coated with a variety of coating layers) at least a part of which is substantially transparent. The second surface 210B may be formed of a rear plate 211 which is substantially opaque. The rear plate 211 may be formed of, for example, coated or colored glass, ceramic, polymer, metal (e.g., aluminum, stainless steel (STS), or magnesium), or any combination thereof. The lateral surface 210C may be formed of a lateral bezel structure (or "lateral member") 218 which is combined with the front plate 202 and the rear plate 211 and includes a metal and/or polymer. The rear plate 211 and the lateral bezel structure 218 may be integrally formed and may be of the same material (e.g., a metallic material such as aluminum).

The front plate 202 may include two first regions 210D disposed at long edges thereof, respectively, and bent and extended seamlessly from the first surface 210A toward the rear plate 211. Similarly, the rear plate 211 may include two second regions 210E disposed at long edges thereof, respectively, and bent and extended seamlessly from the second surface 210B toward the front plate 202. The front plate 202 (or the rear plate 211) may include only one of the first regions 210D (or of the second regions 210E). The first regions 210D or the second regions 210E may be omitted in part. When viewed from a lateral side of the electronic device 101, the lateral bezel structure 218 may have a first thickness (or width) on a lateral side where the first region 210D or the second region 210E is not included, and may have a second thickness, being less than the first thickness, on another lateral side where the first region 210D or the second region 210E is included.

The electronic device 101 may include at least one of a display 201, audio modules 203, 207 and 214, sensor modules 204, 216 and 219, camera modules 205, 212 and 213, a key input device 217, a light emitting device 206, and connector holes 208 and 209. The electronic device 101 may omit at least one (e.g., the key input device 217 or the light emitting device 206) of the above components, or may further include other components.

The display 201 may be exposed through a substantial portion of the front plate 202, for example. At least a part of the display 201 may be exposed through the front plate 202 that forms the first surface 210A and the first region 210D of the lateral surface 210C. Outlines (i.e., edges and corners) of the display 201 may have substantially the same form as those of the front plate 202. The spacing between the outline of the display 201 and the outline of the front plate 202 may be substantially unchanged in order to enlarge the exposed area of the display 201.

A recess or opening may be formed in a portion of a display area of the display 201 to accommodate at least one of the audio module 214, the sensor module 204, the camera module 205, and the light emitting device 206. At least one of the audio module 214, the sensor module 204, the camera module 205, the fingerprint sensor 216, and the light emitting element 206 may be disposed on the back of the display area of the display 201. The display 201 may be combined with, or adjacent to, a touch sensing circuit, a pressure sensor capable of measuring the touch strength (pressure), and/or a digitizer for detecting a stylus pen. At least a part of the sensor modules 204 and 219 and/or at least a part of the key input device 217 may be disposed in the first region 210D and/or the second region 210E.

The audio modules 203, 207 and 214 may correspond to a microphone hole 203 and speaker holes 207 and 214, respectively. The microphone hole 203 may contain a microphone disposed therein for acquiring external sounds and, in a case, contain a plurality of microphones to sense a sound direction. The speaker holes 207 and 214 may be classified into an external speaker hole 207 and a call receiver hole 214. The microphone hole 203 and the speaker holes 207 and 214 may be implemented as a single hole, or a speaker (e.g., a piezo speaker) may be provided without the speaker holes 207 and 214.

The sensor modules 204, 216 and 219 may generate electrical signals or data corresponding to an internal operating state of the electronic device 101 or to an external environmental condition. The sensor modules 204, 216 and 219 may include a first sensor module 204 (e.g., a proximity sensor) and/or a second sensor module (e.g., a fingerprint sensor) disposed on the first surface 210A of the housing 210, and/or a third sensor module 219 (e.g., a heart rate monitor (HRM) sensor) and/or a fourth sensor module 216 (e.g., a fingerprint sensor) disposed on the second surface 210B of the housing 210. The fingerprint sensor may be disposed on the second surface 210B as well as the first surface 210A (e.g., the display 201) of the housing 210. The electronic device 101 may further include at least one of a gesture sensor, a gyro sensor, an air pressure sensor, a magnetic sensor, an acceleration sensor, a grip sensor, a color sensor, an infrared (IR) sensor, a biometric sensor, a temperature sensor, a humidity sensor, or an illuminance sensor.

The camera modules 205, 212 and 213 may include a first camera device 205 disposed on the first surface 210A of the electronic device 101, and a second camera device 212 and/or a flash 213 disposed on the second surface 210B. The camera module 205 or the camera module 212 may include one or more lenses, an image sensor, and/or an ISP. The flash 213 may include, for example, a light emitting diode or a xenon lamp. Two or more lenses (infrared cameras, wide angle and telephoto lenses) and image sensors may be disposed on one side of the electronic device 101.

The key input device 217 may be disposed on the lateral surface 210C of the housing 210. The electronic device 101 may not include some or all of the key input device 217 described above, and the key input device 217 which is not included may be implemented in another form such as a soft key on the display 201. The key input device 217 may include the sensor module 216 disposed on the second surface 210B of the housing 210.

The light emitting device 206 may be disposed on the first surface 210A of the housing 210. For example, the light emitting device 206 may provide status information of the electronic device 101 in an optical form. The light emitting device 206 may provide a light source associated with the operation of the camera module 205. The light emitting device 206 may include, for example, a light emitting diode (LED), an IR LED, or a xenon lamp.

The connector holes 208 and 209 may include a first connector hole 208 adapted for a connector (e.g., a universal serial bus (USB) connector) for transmitting and receiving power and/or data to and from an external electronic device, and/or a second connector hole 209 adapted for a connector (e.g., an earphone jack) for transmitting and receiving an audio signal to and from an external electronic device.

Figure 2C:
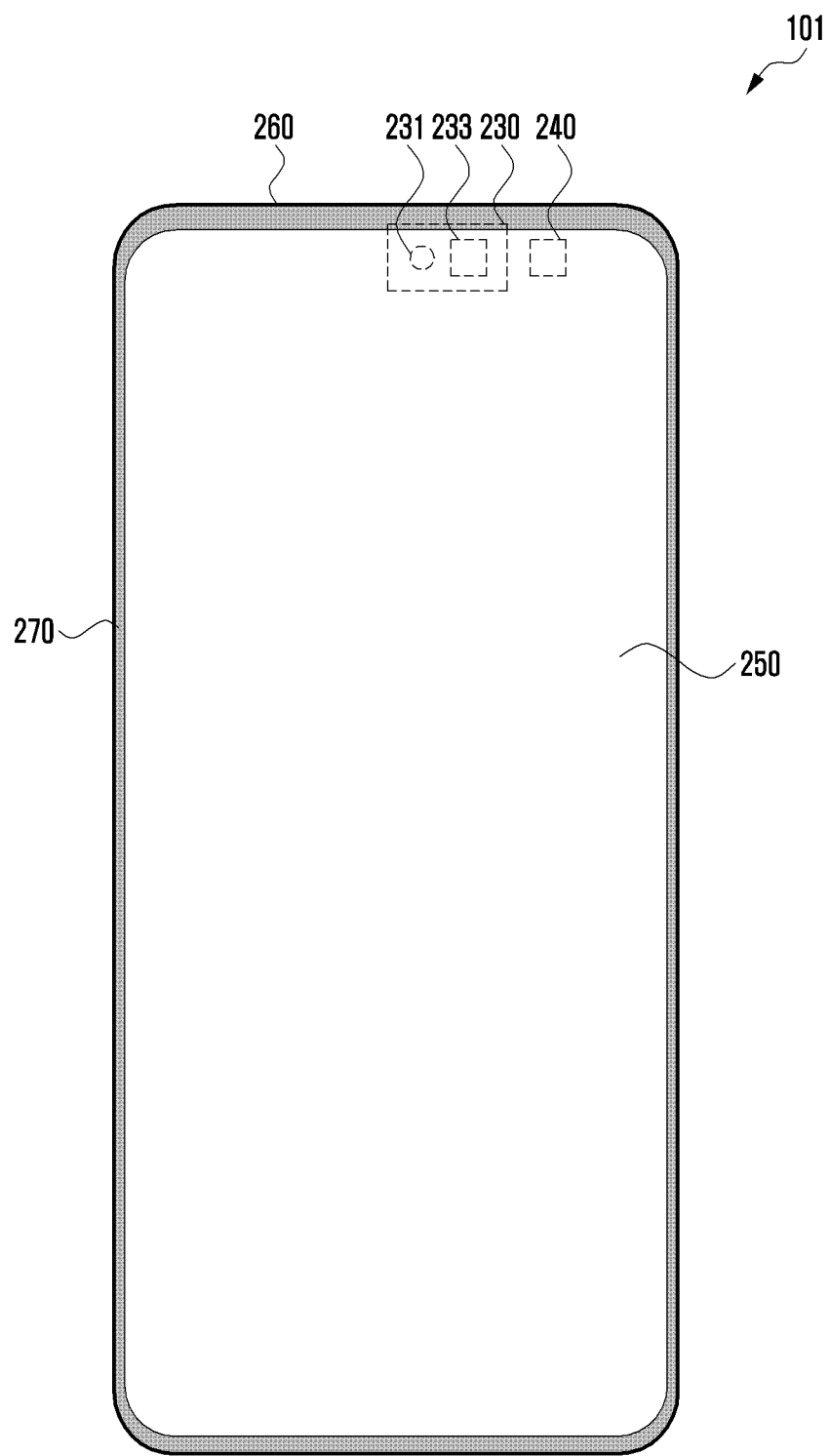
FIG. 2C is an illustration of an electronic device according to an embodiment.

FIG. 2C is an illustration of an electronic device 101 according to an embodiment.

Referring to FIG. 2C, the electronic device 101 may include a housing 260, a proximity sensor 230 (e.g., the sensor module 176 of FIG. 1), an illuminance sensor 240, and a display 250.

The housing 260 may denote an outer part surrounding the electronic device 101. The housing 260 may include a first surface 270, a second surface facing the first surface 270, and a side member surrounding a space between the first surface 270 and the second surface.

The display 250 may be disposed in at least a portion of the first surface 270 of the housing 260, and the display 250 may be disposed in a portion of the first surface 270 to be exposed to the outside. The display 250 may be implemented in various forms including a liquid crystal display (LCD) and an organic light-emitting diode (OLED). The display 250 may display various moving images or still images under the control of the processor 120, and may receive input by various external objects (e.g., a human hand) on the display 250. The display 250 may include a touch sensor to receive input by various external objects.

The touch sensor may be configured as a layer independent of the display panel of the display 250, or may be implemented in an integrated structure such as a display panel. The touch sensor may receive a touch input, which is a touch implemented by direct contact between an external object and the display 250, or a proximity input, which is a touch implemented by proximity of an external object to the display 250 without direct contact therebetween.

The proximity sensor 230 may detect an external object in proximity to the electronic device 101. The proximity sensor 230 may include a light emitter 231 for emitting infrared light and a light receiver 233 for receiving infrared light reflected by an external object.

The illuminance sensor 240 may measure illuminance in the surrounding area of the electronic device 101. The illuminance sensor 240 may measure illuminance by measuring an amount of light through a pre-formed hole.

Recently, with the growing trend in which the electronic device 101 implements a design for increasing an occupying area of the display 250 on the first surface 270 (e.g., a bezel-less display), the area in which various components are disposed in the first surface 270 has been reduced. As the size of the area in which the components are disposed becomes smaller, there is an increasing tendency to place electronic components between the display 250 and the second surface. The proximity sensor 230 and the illuminance sensor 240 may be disposed between the display 250 and the second surface (or under the display 250).

In a case where the proximity sensor 230 is disposed between the display 250 and the second surface, the infrared light emitted from the light emitter 231 of the proximity sensor 230 may affect a driving transistor of the display 250. For example, the driving transistor may bring about a photoelectric effect by infrared rays. The display 250 may display an unintentional screen due to the photoelectric effect caused by the infrared light emitted from the proximity sensor 230. For example, the display 250 may display white dots by infrared light emitted from the proximity sensor 230. Furthermore, the photoelectric effect by infrared light may degrade the durability of the display 250.

The electronic device 101 may determine a state of a user without using the proximity sensor 230, thereby deactivating a function of receiving a touch input. Hereinafter, a detailed embodiment for determining a state of the user without using the proximity sensor 230 is described.

Figure 3:
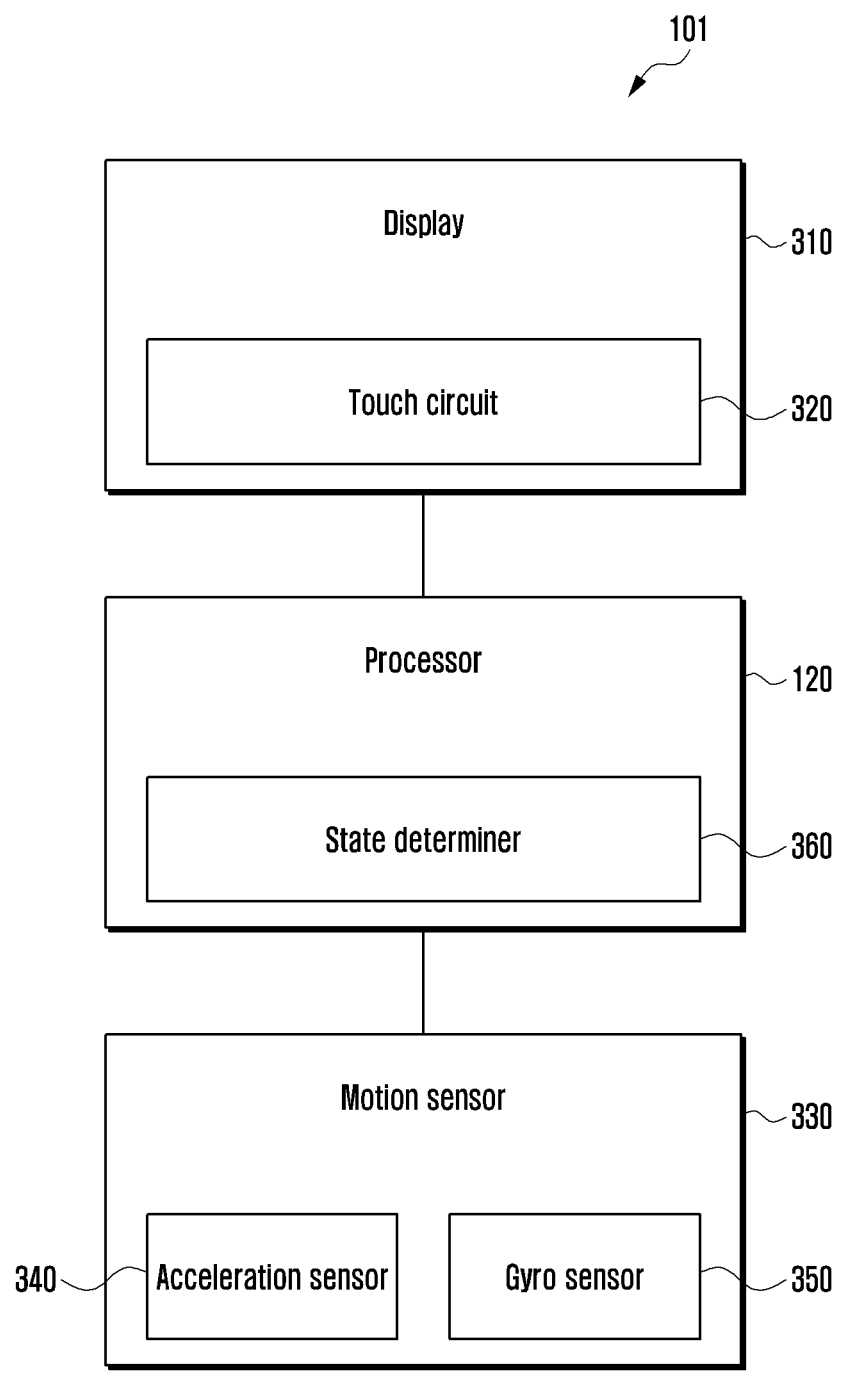
FIG. 3 is a block diagram of an electronic device according to an embodiment.

FIG. 3 is a block diagram of an electronic device 101 according to an embodiment.

Referring to FIG. 3, the electronic device 101 may include a display 310, a motion sensor 330 (or a sensor unit), and a processor 120. The electronic device 101 may be implemented in a form in which the motion sensor 330 and the processor 120 modularized in an integrated circuit (IC) are mounted on a printed circuit board.

The display 310 may visually provide information to the outside (e.g., to a user) of the electronic device 101. The display 310 may include a touch circuit 320 configured to detect a touch or a sensor circuit (e.g., a pressure sensor) configured to measure a strength of a force generated by the touch. The touch circuit 320 may include a touch sensor and a touch sensor IC for controlling the same. The touch circuit 320 may detect a touch input or a hovering input by measuring a change in a signal (e.g., a voltage, an amount of light, a resistance, or an amount of charge) for a certain position of the display 310. The touch circuit 320 may provide the processor 120 with information on the detected touch input or hovering input (e.g., a position, an area, a pressure, or a time). At least a portion (e.g., a touch sensor) of the touch circuit 320 may be included in the display 310 or another component provided outside the display 310, as a portion thereof.

The motion sensor 330 (or sensor unit) may include a device capable of measuring various physical quantities (e.g., a motion sensor or a state sensor) such that the electronic device 101 is capable to estimate a first state (or gesture) of a user and a state of the electronic device 101. The motion sensor 330 may be implemented as a combination of a plurality of sensors for measuring a variety of physical quantities. The motion sensor 330 may include a sensor for measuring an inertia according to a motion of the electronic device 101, for example, an acceleration sensor 340 for measuring acceleration and a gyro sensor 350 for measuring a change in rotation of the electronic device 101. The motion sensor 330 may further include a geomagnetic sensor for measuring a relative displacement with respect to the Earth's magnetic field. The motion sensor 330 may be configured to include a plurality of acceleration sensors 340 and/or a plurality of gyro sensors 350.

The processor 120 may determine states of a user and/or the electronic device 101, based on at least one piece of sensor data obtained from the motion sensor 330, and may control the operation of the display 310 (e.g., turning on/off the display 310), based on the determined state. The processor 120 may include a state determiner 360.

The state determiner 360 may perform various mathematical operations using various physical quantity measurements measured by the motion sensor 330. The state determiner 360 may extract a measurement value provided from the acceleration sensor 340 of the motion sensor 330 (e.g., an acceleration value and/or a gravity value) (e.g., first sensor data), and may predict (or estimate) a motion of the electronic device 101 (e.g., a state (or a gesture) of a user), based on the first sensor data.

The state determiner 360 may extract a measurement value provided from the gyro sensor 350 of the motion sensor 330 (e.g., an angular velocity value) (e.g., second sensor data), may predict (or estimate) a rotation value of the electronic device 101 (e.g., a rotation angle (or tilt) of the electronic device 101), based on the extracted second sensor data, and may determine a state of the electronic device 101, based on the predicted rotation value. An angular velocity of the electronic device 101 indicates a rotational speed of the electronic device 101. The state of the electronic device 101 may be obtained by integrating the measured angular velocity values, and a subsequent state of the electronic device 101 may be predicted, based on the measured angular velocity values. The state determiner 360 may correct the predicted state, based on a gravity value among the first sensor data provided by the acceleration sensor 340, and may improve the accuracy of a prediction of the gyro sensor 350 due to various factors.

The electronic device 101 may recognize a state of the electronic device 101 from sensor data (or measurement values) of the motion sensor 330 (or a sensor unit), and may control an operation of the display 310 (e.g., turning on/off the display 310), based on the state of the electronic device 101. The electronic device 101 may provide a call function (e.g., call reception or call transmission), and may control an operation of the display 310 in order to prevent malfunction of the electronic device 101 due to a touch by an object (e.g., a user's ear, a user's face, or the like) during a call.

The electronic device 101 may recognize states (or motions) associated with the electronic device 101 and/or a user using the motion sensor 330, and may automatically perform a control so as to turn on/off the display 310, based on the recognized result. A proximity sensor of the electronic device 101 may be supplemented (or replaced) by the motion sensor 330, as a component for controlling turning on/off the display 310 during a call, and it is possible to distinguish and identify a first situation in which a user puts the electronic device 101 in contact with the user's ear during a call and a second situation in which the electronic device 101 is removed from the user's ear.

When a user is on the phone (e.g., call reception or call transmission) using the electronic device 101, a user may frequently change the user's state, and/or may frequently move. For example, the user may put the electronic device 101 to the user's ear after initiating a call, and may then perform the call with the electronic device 101 placed on the user's shoulder. In this case, the motion sensor 330 may detect frequent events (e.g., sensed events) according to the motion of the user and/or the motion of the electronic device 101 due to the motion of the user. When entering a call mode (e.g., when initiating a call), the electronic device 101 may operate the motion sensor 330, determine a state of the user when entering the call mode (e.g., the initial state of the user at the beginning of a call), based on the motion sensor 330, and detect a change in the state of the user (e.g., auto-tracking) (e.g., state change-detecting or auto-tracking), based on the state of the user.

The electronic device 101 may produce (or make) various algorithms for respective states for controlling the operation of the display 310 (or decision algorithms for determining states), based at least on the state of a user and the state of the electronic device 101, and may store the produced algorithms in the memory 130.

The electronic device 101 in a call mode may determine an algorithm, based on a state determined using the motion sensor 330, and may determine to turn on/off the display 310, based on the determined algorithm. The electronic device 101 may control turning on/off the display 310 through a combination of the motion sensor 330 and the touch circuit 320. For example, the electronic device 101 may recognize a state using the motion sensor 330, and, if the state satisfies one of certain algorithm conditions, make a final decision on a time (or a situation) of turning on/off the display 310, based on a touch event detected using the touch circuit 320.

The electronic device 101 in a call mode may dynamically apply (or determine) algorithms corresponding to various state changes, based on continuous auto-tracking using the motion sensor 330, minimize the situation in which recognition is disabled only through one certain condition, and minimize malfunction that may occur when recognizing the state (or motion).

The electronic device 101 may include the display 310, the motion sensor 330, and the processor 120, where the processor 120 may be configured to determine a first state associated with a user using the motion sensor 330 while performing a call mode, if a predefined state is detected from the first state, configure an algorithm for determining a second state, based on the first state, determine the second state using the motion sensor 330, based on the configured algorithm, and control an operation of the display 310, based on the result of determining the second state.

The processor 120 may drive the motion sensor 330, based on an initiation of a call mode.

The motion sensor 330 may include the acceleration sensor 340 for measuring acceleration and the gyro sensor 350 for measuring a change in rotation of the electronic device 101. The processor 120 may be configured to track a state change using first sensor data provided from the acceleration sensor 340, determine the first state, based on the tracking result, determine whether or not a predefined state is detected from the first state, if the predefined state is detected, configure an algorithm for determining the second state, based on the first state, determine the second state using second sensor data provided from the gyro sensor 350, and determine whether or not the determined second state conforms to the configured algorithm.

The processor 120 may be configured to identify a final state related to the first state, configure an algorithm to be used in determining the second state, based on the final state, determine whether or not the second state satisfies operational control conditions of the display 310, based on the configured algorithm, and, if the second state satisfies the operational control conditions of the display 310, perform control so as to turn off or turn on the display 310.

The processor 120 may be configured to determine that the operational control conditions are satisfied if the second state conforms to the algorithm, and perform control so as to turn off or turn on the display 310, based on the status of the display 310.

The processor 120 may be configured to track a state change of a user, based on a state at a beginning of a call mode, or track a state change of the user in the call mode, based on a previous state, using the acceleration sensor 340.

The processor 120 may be configured to identify a type of a call mode prior to driving the motion sensor 330, based on an initiation of the call mode and drive the motion sensor 330 if the type of the call mode is a receiver mode.

The display 310 may include a touch circuit 320, and the processor 120 may be configured to drive the touch circuit 320 before controlling an operation of the display 310 and determine whether or not to control the operation of the display 310, based on a touch event provided from the touch circuit 320.

The processor 120 may be configured to determine a final state when entering a call mode, based on the motion sensor 330, drive the touch circuit 320, based on determining the final state, identify the touch event provided from the touch circuit 320, and perform control so as to turn off the display 310 if the touch event is detected.

The processor 120 may be configured to determine a final state in a call mode while the display 310 is turned off, based on the motion sensor 330, identify a touch release event associated with a release of the touch event, based on determining the final state, and perform control so as to turn on the display 310 if the touch release event is detected.

Hereinafter, a method of operating the electronic device 101 is described in detail. Operations performed by the electronic device 101 described below may be performed by at least one processor of the electronic device 101 including the processor 120. The operations performed by the electronic device 101 may be conducted according to instructions that are stored in the memory 130 and, when executed, cause the processor 120 to operate.

Figure 4:
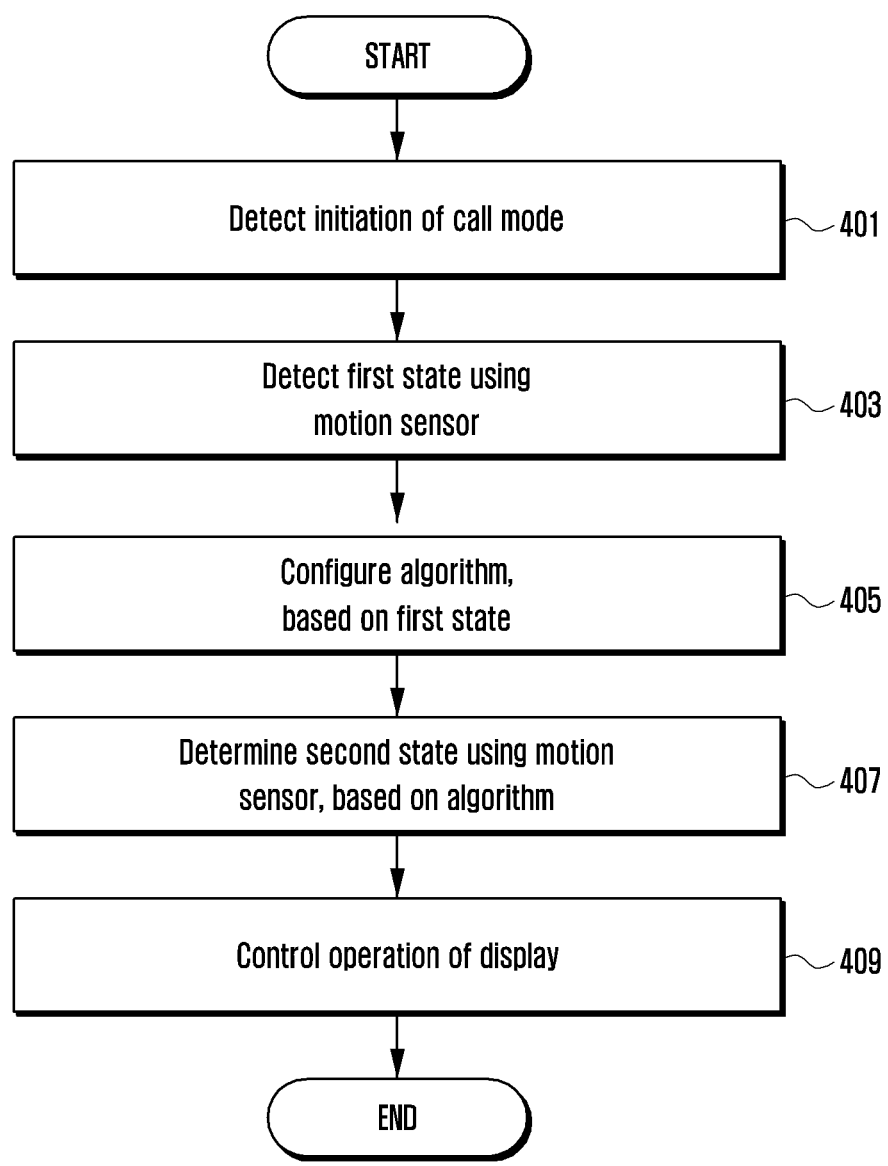
FIG. 4 is a flowchart of a method of operating an electronic device according to an embodiment.

FIG. 4 is a flowchart of a method of operating the electronic device 101 according to an embodiment.

Referring to FIG. 4, in step 401, the processor 120 of the electronic device 101 may detect an initiation of a call mode. The initiation of the call mode may include, for example, an operation of performing a call by transmitting a call, based on a user input, or an operation of performing a call by receiving a call from the outside. The processor 120 may perform in a communication mode through a wireless communication channel established with the electronic device 102 or the electronic device 104 using the communication module 190.

In step 403, the processor 120 may detect a first state using the motion sensor 330 (or a sensor unit). The processor 120, based on the initiation of the call mode, may drive (or activate) the motion sensor 330, and track a first state (or detect a state change), based on the motion sensor 330.

The first state may include, for example, an initial state of a user at a time of entering the call mode (e.g., when the user starts a call). The first state may include the state of the user, which is changed from the initial state of the user. For example, the processor 120 may track a change in the state of the user using the motion sensor 330, and determine the first state, based on the tracking result. The processor 120 may extract a measurement value provided by the acceleration sensor 340 of the motion sensor 330 (e.g., an acceleration value and/or a gravity value) (e.g., first sensor data), and predict (or estimate) a motion of the electronic device 101 (e.g., the state of the user), based on the first sensor data.

The processor 120 may recognize a user's gesture (e.g., an action of the user putting the electronic device 101 in contact with the user's ear) according to an acceleration change due to a motion of the electronic device 101, based on the motion sensor 330, and may track a state change of the user, based on the result of recognizing the user's gesture. The states of the user using the electronic device 101 in a call mode may be variously classified according to a status (or a situation) in which the user uses the electronic device 101, as shown in Table 1 below.

TABLE 1

| Status of user | States (Posture) |
| --- | --- |
| First status (held by right hand) | State 1: held in correct position |
| | State 2: held on shoulder |
| | State 3: held in lying position |
| | State 4: held in lateral position |
| Second status (held by left hand) | State 5: held in correct position |
| | State 6: held on shoulder |
| | State 7: held in lying position |
| | State 8: held in lateral position |
| Third status (viewing screen) | State 9: viewing in correct position |
| | State 10: viewing in lying position |
| | State 11: viewing in lateral position |

In step 405, the processor 120 may configure an algorithm, based on the first state. The algorithm may be a criterion for determining a second state using the motion sensor 330. The processor 120 may identify a first state, based on the motion sensor 330, and may configure an algorithm conforming to the first state. For example, the processor 120 may configure (or reconfigure) (e.g., dynamically configure or dynamically change) an algorithm to be used in determining the second state, based on the result of determining the first state. For example, the processor 120 may dynamically configure (or change) an algorithm according to a final state (e.g., a first state decision value) determined based on auto-tracking.

In step 407, the processor 120 may determine a second state using the motion sensor 330, based on the configured algorithm. The processor 120 may identify the second state (e.g., a gesture), based on the algorithm configured according to the result of the first state. The processor 120 may determine the second state, based on a measurement value provided from the motion sensor 330, and finally determine the second state, based on the algorithm configured according to the first state (e.g., a conditional confirmation).

The second state may indicate, for example, a state of the electronic device 101 (or currently given (or placed) status), and include a rotation value of the electronic device 101 (e.g., a rotation angle (or tilt) of the electronic device 101).

The processor 120 may extract a measurement value provided by the gyro sensor 350 of the motion sensor 330 (e.g., an angular velocity value) (e.g., second sensor data), predict (or estimate) a rotation value of the electronic device 101, based on the second sensor data, and determine the state of the electronic device 101 (e.g., the second state), based on the predicted rotation value. The processor 120 may recognize a change in rotation of the electronic device 101, based on the motion sensor 330.

The angular velocity of the electronic device 101 indicates a rotational speed of the electronic device 101. The state of the electronic device 101 may be obtained by integrating the measured angular velocity values, and a subsequent state of the electronic device 101 may be predicted, based on the measured angular velocity values. The processor 120 may correct the predicted second state, based on a gravity value among the first sensor data provided by the acceleration sensor 340. For example, the second sensor data may include an angular velocity value of the gyro sensor 350 and a gravity value of the acceleration sensor 340.

The processor 120 may dynamically configure an algorithm according to the first state determined based on detecting a state change, and finally determine the second state, based on the configured algorithm. For example, the processor 120 may identify various state changes, such as an operation in which the user moves the electronic device 101 to the user's ear and/or around the user's ear, an operation in which the user moves the electronic device 101 away from the user's ear, and an operation in which the user changes the state while the electronic device 101 is placed on the user's shoulder, in the status in which the user views the electronic device 101, in which the user puts the electronic device 101 in contact with the user's ear, in which the user places the electronic device 101 on the user's shoulder, or the like.

The electronic device 101 may store the algorithm to be used in determining the second state, based at least on the first state of the user, and the processor 120 may determine the second state, based on the algorithm dynamically configured for each first state (e.g., an algorithm for determining the second state), and may determine whether or not the second state conforms to the algorithm condition.

In step 409, the processor 120 may control an operation of the display 310 (e.g., turning on/off the display 310), based on the result of determining the second state. The processor 120 may control the display 310 so as to be turned off or turned on, based on the determination in which the second state conforms to the algorithmic condition.

Figure 5:
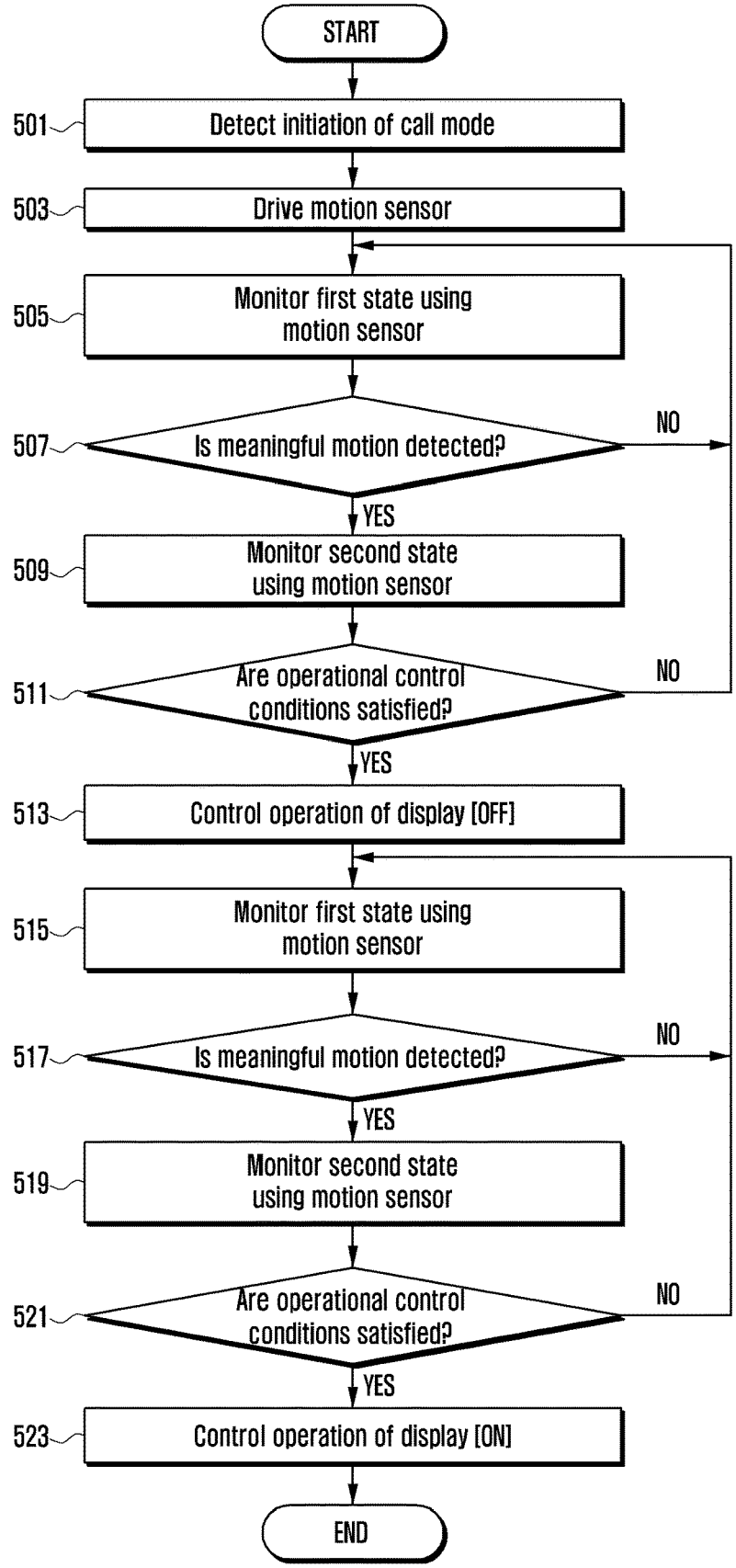
FIG. 5 is a flowchart of a method of operating an electronic device according to an embodiment.

FIG. 5 is a flowchart of a method of operating the electronic device 101 according to an embodiment.

Referring to FIG. 5, steps 501 and 503 may indicate an initiation step for initiating auto-tracking (e.g., state change-detecting), based on entry into a call mode, steps 505 to 513 may indicate a first operation (e.g., an off-operation) control step of turning off the display 310 in a call mode, and steps 515 to 523 may indicate a second operation (e.g., an on-operation) control step of turning on the display 310 in a call mode while the display 310 is turned off.

The first operation control step and the second operation control step may include a step of identifying a first state associated with a user and a second state associated with the electronic device 101, based on the motion sensor 330, and controlling the operation of the display 310, based on the first state and the second state. The first operation control step and the second operation control step may have the same or similar operations, such as using the motion sensor 330 for controlling turning on/off the display 310, configuring an algorithm for determining the second state, based on the first state, and determining the second state, based on the configured algorithm, but may have different operations such as turning on/off the display 310.

In step 501, the processor 120 of the electronic device 101 may detect an initiation of a call mode. The initiation of the call mode may include, for example, an operation of performing a call by transmitting a call, based on user input, or an operation of performing a call by receiving a call from the outside.

In step 503, the processor 120 may drive a motion sensor 330. The processor 120, based on detecting the initiation of the call mode (or entry into the call mode), may drive (or activate) the acceleration sensor 340 and/or the gyro sensor 350 of the motion sensor 330. For example, based on the initiation of the call mode, the processor 120 may make a request for driving the motion sensor 330, such as the acceleration sensor 340 and/or the gyro sensor 350, and may allow the motion sensor 330 to start measurement.

In step 505, the processor 120 may monitor a first state using the motion sensor 330. The processor 120 may track a first state associated with the user (or detect a state change), based on the motion sensor 330. The first state may include, for example, an initial state of the user at a time of entering the call mode (e.g., when the user starts a call) and/or a state of the user changed from the initial state of the user. For example, the processor 120 may track a state change of the user using sensor data of the motion sensor 330.

The processor 120 may extract a measurement value provided by an acceleration sensor 340 of the motion sensor 330 (e.g., an acceleration value and/or a gravity value) (e.g., first sensor data), and may predict (or estimate) a motion of the electronic device 101 (e.g., a state (or gesture) of the user), based on the first sensor data.

The processor 120 may recognize a user's gesture (e.g., the action of putting the electronic device 101 in contact with the user's ear) according to an acceleration change due to the motion of the electronic device 101, based on the motion sensor 330. The processor 120 may track a first state whenever the motion of the electronic device 101 occurs, based on the motion sensor 330, and track the first state (or a state change) of the user from the initiation of a call to the end thereof (e.g., the termination of the call).

In step 507, the processor 120 may determine whether or not a meaningful motion is detected based on a monitoring result. The processor 120 may determine whether or not the first state corresponds to a predefined state (e.g., the states in FIG. 7, for example, the predefined states shown in Table 1 above), thereby determining a meaningful motion, based on whether or not the first state is included in the predefined states.

The predefined states may be stored, for example, as state information related to various call states, in the memory 130. Various state changes that may occur while the user conducts a call may be predefined based on the first state, and if the state is changed to another state during a call, a motion of the electronic device 101 may be determined to be a meaningful motion.

Figure 7:
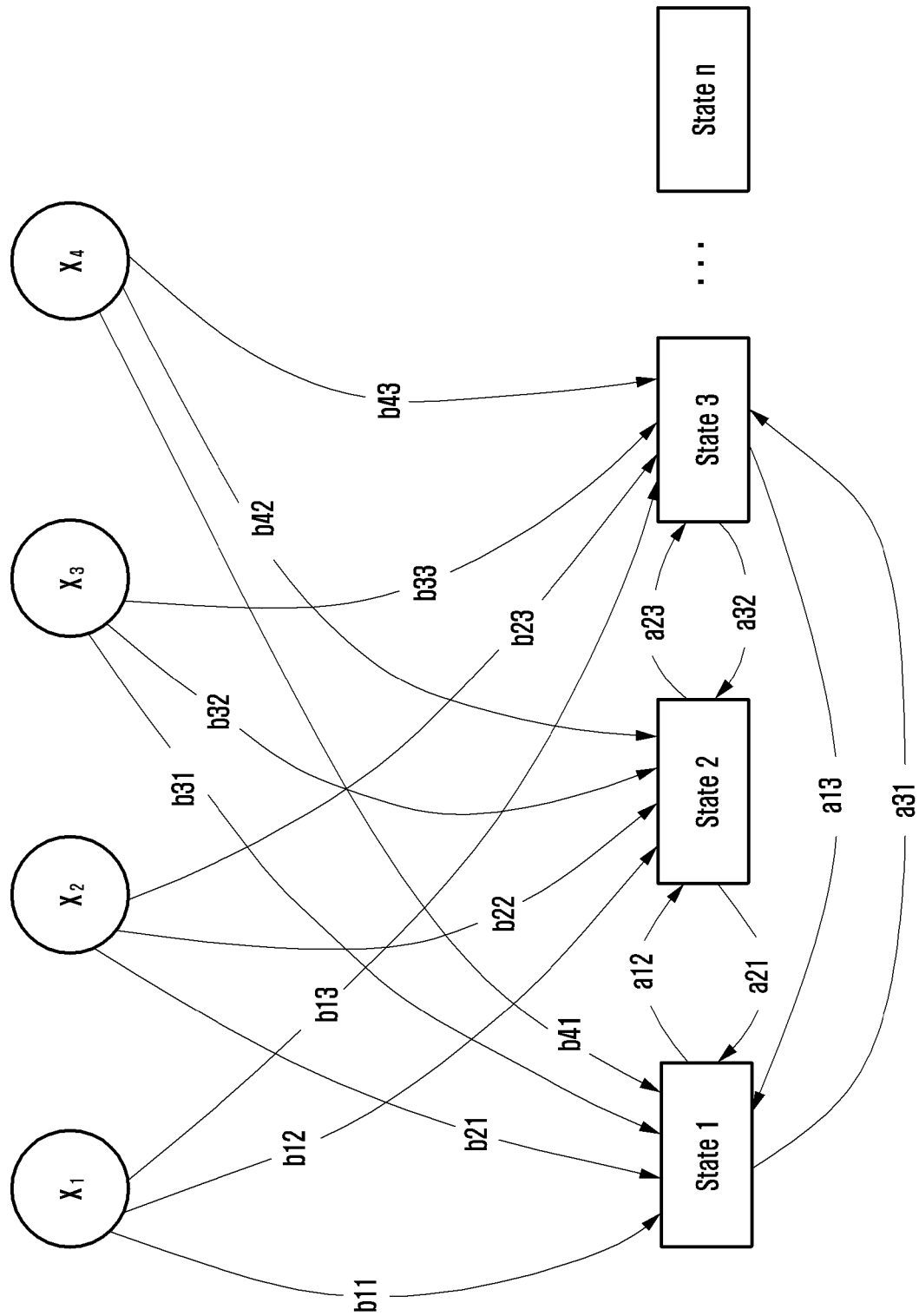
FIG. 7 is an illustration of auto-tracking a state change of an electronic device according to an embodiment.

The processor 120 may detect a meaningful motion, for example, based on a change in the state to a predefined call state (e.g., the call state defined in FIG. 7). For example, the processor 120 may determine that there is a meaningful motion if a change in the state corresponds to a certain predefined state, and may determine that there is no meaningful motion if a change in the state does not correspond to a predefined state (e.g., walking during the same call state).

The processor 120 may track a measurement value (e.g., sensor data) provided from the acceleration sensor 340, thereby determining whether or not the state is changed to a certain state. If the state change has a predetermined size or greater, based on the first sensor data measured by the motion sensor 330, the processor 120 may determine the state change to be a meaningful motion. For example, the processor 120 may determine whether or not there is a meaningful motion, based on a magnitude of the measurement value (e.g., an acceleration change) provided from the acceleration sensor 340 of the motion sensor 330.

The processor 120 may determine a motion of the user moving the electronic device 101 to the user's ear and/or a motion of the user moving the electronic device 101 away from the user's ear, based on the monitoring result. The processor 120 may configure an algorithm for determining a second state, based on the meaningful motion with respect to the first state. The processor 120 may determine a first state, based on the motion sensor 330, and may configure (or reconfigure) (e.g., dynamically configure or dynamically change) an algorithm to be used in determining a second state, based on the result of determining the first state.

If no meaningful motion is detected in step 507 (e.g., "No" in step 507), the processor 120 may proceed to step 505, thereby performing step 505 and subsequent operations thereof. The motion that is not meaningful may include, for example, a case where the user performs a call without changing state, a case where the user moves while maintaining a call state, or the like.

For example, since it is not necessary to change the algorithm configured based on the first state in a case where the user performs a call without changing state, the algorithm is not required to be reconfigured.

For example, since the call state is not changed in the case where the user moves while maintaining the call state, an existing display control algorithm must remain. However, even if a small motion of the user occurs, reactions thereto may affect the sensor output due to the characteristics of the motion sensor 330. Therefore, it may be possible to determine that the motion is not meaningful utilizing, for example, the physical features (X) shown in FIG. 7.

If a meaningful motion is detected in step 507 (e.g., "Yes" in step 507), the processor 120 may monitor a second state using the motion sensor 330 in step 509. The second state may indicate, for example, the state of the electronic device 101 (or currently given (or placed) status), and may include a rotation value of the electronic device 101 (e.g., a rotation angle (or tilt) of the electronic device 101). The processor 120 may extract a measurement value provided by the gyro sensor 350 of the motion sensor 330 (e.g., an angular velocity value) (e.g., second sensor data), predict (or estimate) a rotation value of the electronic device 101, based on the second sensor data, and determine the state of electronic device 101 (e.g., a second state), based on the predicted rotation value.

The processor 120 may recognize a change in rotation of the electronic device 101, based on the motion sensor 330. The angular velocity of the electronic device 101 indicates a rotational speed of the electronic device 101. The state of the electronic device 101 may be obtained by integrating the measured angular velocity values, and a subsequent state of the electronic device 101 may be predicted, based on the measured angular velocity values. The processor 120 may correct the predicted second state, based on a gravity value among the first sensor data provided by the acceleration sensor 340.

In step 511, the processor 120 may determine whether or not operational control conditions of the display 310 are satisfied based on the second state. The processor 120 may determine the status of the electronic device 101 (e.g., the state (or status) of the electronic device 101 according to the first state associated with the user), based on the first state associated with the user and the second state associated with the electronic device 101. The processor 120 may identify the second state (e.g., a gesture), based on an algorithm configured based on the result of the first state.

The processor 120 may determine the second state, based on a measurement value provided from the motion sensor 330, and finally determine the second state, based on the algorithm configured according to the first state (e.g., a conditional confirmation). For example, the processor 120 may dynamically configure an algorithm for determining the second state according to the first state determined based on detecting a state change, and finally determine the second state, based on the configured algorithm. The processor 120 may identify a status in which the user views the electronic device 101, a status in which the user puts the electronic device 101 in contact with the user's ear, a status in which the user places the electronic device 101 on the user's shoulder, and the like.

The processor 120 may determine that operational control conditions are satisfied if the second state conforms to algorithm conditions, and determine that operational control conditions are not satisfied if the second state does not conform to the algorithm conditions. The processor 120 may determine operational control conditions (e.g., a first operation (e.g., an off-operation) control condition or a second operation (e.g., an on-operation) control condition) of the display 310, based on whether or not the second state corresponds to the state according to the algorithm configured according to the first state.

In step 511, if the second state does not meet the operational control conditions, based on the result of determining the second state (e.g., "No" in step 511), the processor 120 may proceed to step 505, thereby performing step 505 and subsequent operations thereof. For example, if the second state does not conform to the algorithm conditions, the processor 120 may maintain the on state of the display 310, and proceed to step 505 to perform an auto-tracking operation.

In step 511, if the second state meets the operational control conditions, based on the result of determining the second state (e.g., "Yes" in step 511), the processor 120 may control the operation of the display 310 (e.g., turning on/off the display 310) in step 513. If the second state conforms to the algorithm conditions, the processor 120 may perform control so as to turn off the display 310 in the on state at the time of entry into a call mode. The turning off of the display 310 may include, for example, an operation of shutting off (or turning off) the power to the display 310.

In step 515, the processor 120 may monitor the first state using the motion sensor 330. The processor 120 may continually operate the motion sensor 330 even during a call while the display 330 is turned off, thereby monitoring the first state.

In step 517, the processor 120 may determine whether or not a meaningful motion is detected based on the monitoring result. The processor 120 may determine whether or not a meaningful motion is detected from the first state of the user, which is tracked during a call while the display 310 is turned off.

If no meaningful motion is detected in step 517 (e.g., "No" in step 517), the processor 120 may proceed to step 515 to perform step 515 and subsequent operations thereof. The processor 120 may maintain the off state of the display 310.

If a meaningful motion is detected in step 517 (e.g., "Yes" in step 517), the processor 120 may monitor the second state using the motion sensor 330 in step 519. If a meaningful motion is detected during a call while the display 330 is turned off, the processor 120 may monitor the second state using the motion sensor 330.

In step 521, the processor 120 may determine whether or not operational control conditions of the display 310 are satisfied based at least on the second state. The processor 120 may determine the second state, based on a measurement value provided from the motion sensor 330, and finally determine the second state, based on an algorithm configured according to the first state. For example, the processor 120 may dynamically configure an algorithm for determining the second state according to the first state determined based on detecting a state change, and finally determine the second state, based on the configured algorithm.

If the second state conforms to the algorithm conditions, the processor 120 may determine that the operational control conditions are satisfied, and if the second state does not conform to the algorithm conditions, the processor 120 may determine that the operational control conditions are not satisfied. The processor 120 may determine operational control conditions of the display 310 (e.g., a first operation (e.g., off) control condition or a second operation (e.g., on) control condition), based on whether or not the second state corresponds to the state according to the algorithm configured according to the first state.

In step 521, if the second state does not meet the operational control conditions, based on the result of determining the second state (e.g., "No" in step 521), the processor 120 may proceed to step 515, thereby performing step 515 and subsequent operations thereof. For example, if the second state does not meet the algorithm conditions, the processor 120 may maintain the off state of the display 310, and proceed to step 515 to perform an auto-tracking operation.

In step 521, if the second state meets the operational control conditions, based on the result of determining the second state (e.g., "Yes" in step 521), the processor 120 may control the operation of the display 310 (e.g., turning on/off the display 310) in step 523. If the second state conforms to the algorithm conditions, the processor 120 may perform control so as to turn on the display 310 in the off state during a call. The turning on of the display 310 may include, for example, an operation of supplying (or turning on) the power to the display 310.

Figure 6:
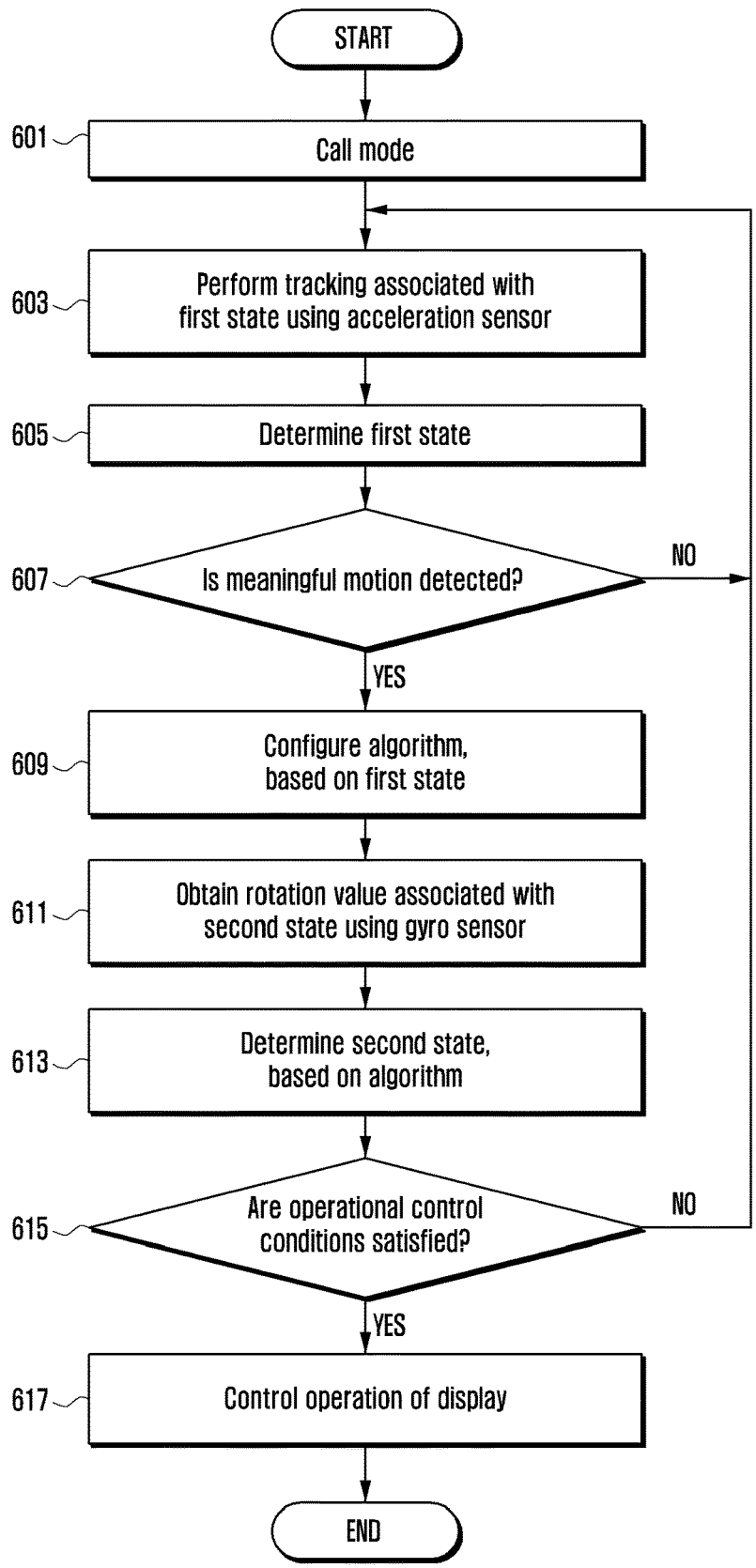
FIG. 6 is a flowchart of a method of operating an electronic device according to an embodiment.

FIG. 6 is a flowchart of a method of operating the electronic device 101 according to an embodiment.

Referring to FIG. 6, an algorithm is dynamically configured (or reconfigured), based on a measurement value provided from the motion sensor 330 and the operation of the display 310 is controlled by determining a final state, based on the configured algorithm, in a first operation control step of turning off the display 310 and a second operation control step of turning on the display 310 in a call mode. The motion sensor 330 includes the acceleration sensor 340 and the gyro sensor 350, and a first state associated with a user and a second state associated with the electronic device 101 are determined by separating the acceleration sensor 340 and the gyro sensor 350.

In step 601, the processor 120 of the electronic device 101 may operate a call mode. In step 601, the display 310 may be in an on state when the electronic device 101 enters a call mode, and in an off state during a call while the user puts the electronic device 101 in contact with the user's ear in a certain state.

In step 603, the processor 120 may perform tracking to determine a first state using the acceleration sensor 340. The processor 120 may track a motion of the user according to the first state, based on sensor data of the acceleration sensor 340. For example, a state change or a motion (e.g., a movement) of the user may occur while the user performs a call using the electronic device 101. For example, the user may perform a call by putting the electronic device 101 in contact with the user's ear after initiating the call, perform a call while placing the electronic device 101 on the user's shoulder for a while, or perform a call while lying down. In this case, the acceleration sensor 340 may track a change in an event (or sensor data) according to the motion of the user.

The processor 120 may detect a change in the state of the user, based on the state at an initiation of a call, or detect a change in the state of the user, based on a previous state during a call, using the acceleration sensor 340. The processor 120 may track a first state whenever the motion of the electronic device 101 occurs, based on the measurement values (e.g., acceleration values and/or gravity values) provided by the acceleration sensor 340, and track the first state of the user (or a state change) from the beginning of the call to the end thereof (e.g., a termination of the call).

In step 605, the processor 120 may determine (or identify) a first state (e.g., a state change), based on the tracking result.

In step 607, the processor 120 may determine whether or not a meaningful motion is detected from the determined first state. The processor 120 may determine whether or not the first state corresponds to a predefined state (e.g., the states in FIG. 7, for example, the predefined states shown in Table 1 above), thereby determining a meaningful motion, based on whether or not the first state is included in the predefined states. The predefined states may be stored, for example, as state information related to various call states, in the memory 130. Various state changes that may occur while the user conducts a call may be predefined based on the first state, and, if the state is changed to another state during a call, a motion of the electronic device 101 may be determined to be a meaningful motion.

The processor 120 may detect a meaningful motion, for example, based on a change in the state to a predefined call state (e.g., the call state defined in FIG. 7). For example, the processor 120 may determine that there is a meaningful motion if the state is changed to a certain predefined state, and may determine that there is no meaningful motion if the change in the state does not correspond to the predefined states (e.g., walking during the same call state).

The processor 120 may track a measurement value (e.g., sensor data) provided from the acceleration sensor 340, thereby determining whether or not the state is changed to a certain state. The first state may actually change between predefined call states, and the processor 120 may determine the change between the call states to be a meaningful motion. If a user who is on the phone while sitting and putting the electronic device 101 in contact with the user's left ear changes the current state to another call state in which the user places the electronic device 101 on the user's shoulder because the user wishes to use both hands for work, the call state determined based on the first state is changed (e.g., a state change), and these various state changes may be determined to be meaningful motions.

If no meaningful motion is detected in step 607 (e.g., "No" in step 607), the processor 120 may proceed to step 603, thereby performing step 603 and subsequent operations thereof. A motion that is not meaningful may include, for example, a case where the user performs a call without changing the state, a case where the user moves while maintaining the call state, or the like. For example, since it is not necessary to change the algorithm configured based on the first state in the former case, the algorithm is not required to be reconfigured. For example, since the call state is not changed in the latter case, an existing display control algorithm must remain. However, even if a small motion of the user occurs, reactions thereto may affect the sensor output due to the characteristics of the motion sensor 330. Therefore, it may be possible to determine that the motion is not meaningful utilizing, for example, the physical features (X) shown in FIG. 7.

If a meaningful motion is detected in step 607 (e.g., "Yes" in step 607), the processor 120 may configure an algorithm, based on the first state in step 609. The algorithm may be configured to correspond to the first state identified using the acceleration sensor 340, and be a criterion for determining a second state (e.g., a gesture) using the gyro sensor 350. The processor 120 may identify the first state, based on the acceleration sensor 340, and configure the algorithm corresponding to the first state. For example, the processor 120 may configure (or reconfigure) (e.g., dynamically configure or dynamically change) the algorithm to be used in determining the second state, based on the result of determining the first state. For example, the processor 120 may dynamically configure (or change) the algorithm according to a final state (e.g., a first state decision value) determined based on auto-tracking. The processor 120 may configure the algorithm suitable for the state determined based on the motion sensor 330 (e.g., the algorithm is a reference for determining the second state and is configured using the result of the first state), and determine the second state (e.g., a final gesture) using the motion sensor 330, based on the configured algorithm.

Steps 607 and 609 are not limited to the sequence shown in FIG. 6, but may be performed in sequence, in parallel, or in reverse order. The processor 120 may operate so as to determine the first state in step 605, configure an algorithm, based on the first state in step 609, and detect a meaningful motion after the configuration of the algorithm in 607.

In step 611, the processor 120 may obtain a rotation value of the electronic device 101 (or sensor data) (e.g., a rotation angle (or tilt) of the electronic device 101) associated with the second state using the gyro sensor 350. The processor 120 may predict (or estimate) a rotation value of the electronic device 101, based on the measurement value (e.g., an angular velocity value) provided from the gyro sensor 350, and determine the state of the electronic device 101 (e.g., the second state), based on the predicted rotation value. The processor 120 may obtain the state of the electronic device 101 by integrating the angular velocity values measured by the gyro sensor 350, and predict the state of the electronic device 101, based on the measured angular velocity values.

In step 613, the processor 120 may determine a second state, based on the configured algorithm. The processor 120 may determine a second state (e.g., a final state or gesture) using the gyro sensor 350, based on the algorithm configured to correspond to the first state (e.g., the state associated with the user) determined based on the acceleration sensor 340.

The processor 120 may determine the second state, based on a measurement value provided from the gyro sensor 350, and finally determine the second state, based on the algorithm configured according to the first state (e.g., a conditional confirmation). For example, the processor 120 may identify various state changes, such as an operation in which the user moves the electronic device 101 to the user's ear and/or around the user's ear, an operation in which the user moves the electronic device 101 away from the user's ear, or an operation in which the user changes the state while the electronic device 101 is placed on the user's shoulder in the status in which the user views the electronic device 101, the user puts the electronic device 101 in contact with the user's ear, the user places the electronic device 101 on the user's shoulder, or the like.

The electronic device 101 may store an algorithm to be used in determining the second state, based at least on the first state of the user, and the processor 120 may determine the second state, based on an algorithm dynamically configured for each first state, and may determine whether or not the second state conforms to the algorithm conditions.

In step 615, the processor 120 may determine whether or not operational control conditions of the display 310 (e.g., a first operation (such as off) control condition or a second operation (such as on) control condition) are satisfied based on the result of determining the second state. The processor 120 may determine operational control conditions of the display 310, based on whether or not the second state corresponds to the state according to the algorithm configured according to the first state. If the second state conforms to the algorithm conditions, the processor 120 may determine that the operational control conditions are satisfied, and if the second state does not conform to the algorithm conditions, the processor 120 may determine that the operational control conditions are not satisfied.

In general, an operation in which the user moves the electronic device 101 from the placed position to the user's ear and an operation in which the user moves the electronic device 101 on the user's shoulder to the front of the user's eyes during a call may produce very similar measurement values (or sensor data) (e.g., first sensor data of the acceleration sensor 340 and second sensor data of the gyro sensor 350), which makes it difficult to distinguish therebetween. Thus, auto-tracking (or state change-detecting) may be continuously performed in a call mode in order to accurately determine the state in the above situation, thereby determining the first state. For example, the processor 120 may determine the first state corresponding to the state of the user (e.g., "state 1", "state 2", . . . ), as shown in Table 1 above, based on auto-tracking, in a call mode.

The processor 120 may adaptively (or dynamically) configure (or change) an algorithm to be used in determining the second state according to the final state (e.g., the first state) determined based on auto-tracking. For example, the processor 120 may determine state 1, may configure algorithm 1 for determining the second state, based on the determined state 1, and may dynamically reconfigure algorithm 2 for determining the second state, based on state 2 (e.g., a state change from state 1 to state 2), according to the state change.

The algorithm used to determine the second state may be configured (or dynamically changed) based on the first state, thereby accurately distinguishing between the operations, which make it difficult to distinguish from each other because of similar sensor data, and reducing malfunction. The processor 120 may determine the operational control conditions to be different between the second state based on algorithm 1 according to state 1 and the second state based on algorithm 2 according to state 2. For example, even in the same second state, the display operation control may differ depending on the algorithm configured according to the first state. Based on this, even if there is almost no motion of the electronic device 101 in a certain axis, it is possible to more accurately determine the operational control conditions of the display 310 by minimizing malfunction.

If the operational control conditions of the display 310 are not satisfied in step 615 (e.g., "No" in step 615), the processor 120 may proceed to step 603 to perform step 603 and subsequent operations thereof.

If the operational control conditions of the display 310 are satisfied in step 615 (e.g., "Yes" in step 615), the processor 120 may control the operation of the display 310 in step 617. The processor 120 may perform control so as to turn off the display 310 in an on state or turn on the display 310 in an off state, based on the fact that the second state conforms to the algorithm conditions. Turning off or turning on the display 310 may include, for example, an operation of shutting off (or turning off) or supplying (or turning on) power to the display 310.

It is possible to configure at least one algorithm according to each of the states related to the user and the electronic device 101 and to dynamically operate operational control conditions of the display 310 for respective ones of various states by auto-tracking various state changes, based on the motion sensor 330 rather than a proximity sensor. It is possible to minimize the issues that may be caused by the method in which the operation of the display 310 is controlled only by one certain condition using the proximity sensor (e.g., issues caused by a corner case or complex interaction between multiple variables and environments) and to minimize malfunction generated in recognizing states (or motions).

In order to determine a case where a user puts the electronic device 101 in contact with the user's ear (or the electronic device 101 approaches the user's ear) during a call or a case where the user removes the electronic device 101 from the user's ear (or the electronic device 101 moves away from the user's ear), the motion sensor 330, such as the acceleration sensor 340 and the gyro sensor 350, may be used, instead of (or replacing) a proximity sensor.

A state change may be continuously (or consistently) auto-tracked from an initial state associated with a user and the electronic device 101 using the motion sensor 330, thereby adaptively and differently reconfiguring the algorithm related to the control of the display 310, based on the last state. Accordingly, it is possible to adaptively (or dynamically) configure the algorithms suitable for various state changes of the user and the electronic device 101, and to perform control so as to turn on/off the display 310 according to the situation (or the final state), based on the configured algorithm.

FIG. 7 is an illustration of auto-tracking a change in a state of an electronic device according to an embodiment.

The proximity of the electronic device 101 may not be determined during a call using only a proximity sensor because of a user's hair or skin color. In addition, in the case of a display 310 provided in the electronic device 101, since the proximity sensor is mounted under the display 310 (e.g., inside the housing 210), proximity of an external object is to be determined using light passing through the display 310, but the proximity sensor cannot be used while the display 310 is turned on because of the photoelectric effect and/or a burn-in phenomenon by the proximity sensor. For example, since the proximity sensor cannot be used in an on state of the display 310, it is difficult to set a baseline for a release of proximity, and to guarantee the performance of determining the release of proximity. Thus, the performance of the proximity sensor may be degraded, or a malfunction may occur in the control of the display 310 due to deterioration or non-operation of the display 310.

In relation to the control of the operation of the display 310 during a call, it is possible to recognize a proximity status using other sensors or modules (e.g., the motion sensor 330) replacing and/or supplementing the proximity sensor, thereby preventing the occurrence of a mistouch during a call.

A state of a user may be auto-tracked during a call. If the user performs a call using the receiver hole 214 of the electronic device 101 in a call mode (e.g., a call mode using a receiver) other than the call mode using the speaker hole 207 or an external speaker (e.g., earphones), such as a speaker mode and/or a Bluetooth™ mode, among the call modes of the electronic device 101, the angle of the electronic device 101 may be detected as an angle at which the user views the electronic device 101. The electronic device 101 may track the state whenever a meaningful motion of the electronic device 101 occurs based on the initial state thereof, and may continuously track the motion of the user from the initiation of the call to the end thereof (e.g., the termination of the call). The states of the user may be defined as the example of Table 1 above, but are not limited thereto.

An algorithm as a criterion for determining the second state may be dynamically configured (or changed) according to the state determined based on state auto-tracking (e.g., the final state determined as a first state (e.g., the previous/current state)).

If all of the states are determined using a single algorithm, it is impossible to accurately distinguish the on/off state of the display 310. For example, an operation in which the user moves the electronic device 101 from the placed position to the user's ear and an operation in which the user moves the electronic device 101 on the user's shoulder to the front of the user's eyes during a call may produce very similar sensor data, which makes it difficult to distinguish therebetween.

Auto-tracking (or state change-detecting) may be continuously performed in a call mode in order to accurately determine the state in the above situation, thereby determining the first state. For example, it is possible to determine the first state corresponding to the state of the user (e.g., "state 1", "state 2", . . . ), as shown in Table 1 above, based on auto-tracking, in a call mode. The processor 120 may adaptively (or dynamically) configure (or change) an algorithm to be used in determining the second state according to the final state (e.g., the first state) determined based on auto-tracking. For example, the processor 120 may determine state 1, configure algorithm 1 for determining the second state, based on the determined state 1, and dynamically reconfigure algorithm 2 for determining the second state, based on state 2 (e.g., a state change from state 1 to state 2), according to the state change.

The algorithm used to determine the second state may be configured (or dynamically changed) based on the first state, thereby accurately distinguishing between the operations, which make it difficult to distinguish from each other because of similar sensor data, and reducing malfunction. The processor 120 may determine the operational control conditions to be different between the second state based on algorithm 1 according to state 1 and the second state based on algorithm 2 according to state 2. For example, even in the same second state, the display operation control may differ depending on the algorithm configured according to the first state.

Hereinafter, an example of auto-tracking a state and/or a state change during a call is described with reference to FIG. 7.

As described above, auto-tracking may be provided during a call in order to automatically recognize the status of a user, which dynamically changes from the moment the user starts a call to the end of the call, utilizing sensor data (e.g., the first sensor data of the acceleration sensor 340 and/or the second sensor data of the gyro sensor 350).

Auto-tracking, as shown in FIG. 7, may define physical features (X) (e.g., X1, X2, X3, and X4) in various states that may occur during a call (e.g., state 1, state 2, state 3, and state n) using sensor data (e.g., the first sensor data and/or the second sensor data). Probabilities (b) of occurrence in various states during a call may be stochastically declared (e.g., bxy, x=1, 2, 3, . . . , y=1, 2, 3, . . . ), based on the defined physical features (X).

The state (or posture) represents a call position, and may be classified into, for example, state 1 (e.g., sitting/standing) (or call position 1), state 2 (e.g., lying) (or call position 2), or state 3 (e.g., shoulder) (or call position 3), but is not limited thereto. The physical features (X) may include states (e.g., rotation angles) of the electronic device 101 defined based on the sensor data.

The state of the electronic device 101 may be, for example, a direction in which the electronic device 101 is directed in a space. The state of the electronic device 101 may be expressed as three free rotations with respect to a reference coordinate system of the coordinate system fixed to the electronic device 101. The reference coordinate system may include an inertial coordinate system fixed in the inertial space and an orbital coordinate system that rotates along with the motion of the electronic device 101.

The state of the electronic device 101 may use Euler angles, but is not limited thereto. Euler angles denote three angles introduced to indicate a direction in which the electronic device 101 is placed in a three-dimensional space, and the direction of the electronic device 101 placed in a three-dimensional space may be obtained through three rotations using the Euler angles. For example, the Euler angles may be represented as three consecutive rotations in coordinate axes (e.g., a rotation in a three-dimensional space coordinate system (x, y, z)), and rotation angles in the X, Y, and Z-axis directions may be expressed as roll (e.g., a rotation in the X-axis), pitch (e.g., a rotation in the Y-axis), and yaw (e.g., a rotation in the Z-axis), respectively. For example, in the example shown in FIG. 7, a first physical feature X1 may represent roll, a second physical feature X2 may represent pitch, and a third physical feature X3 may represent yaw. The physical features (X) may be defined as a combination of at least two rotation angles, and may also be defined as other rotation angles.

In general, in a case where a user answers a call using the electronic device 101, the user checks a call screen in front of the user's chest, presses a call start button, and then moves the electronic device 101 toward a right ear or a left ear. It is possible to automatically determine a call position (or a state) according to a state at a beginning of the call and a state during the call through an output (e.g., measurement values or sensor data) provided from the motion sensor 330 in the above case, and to control the display 310 utilizing display control logic preconfigured based on the call position (e.g., the first state) and the state of the electronic device 101 (e.g., the second state). If a complex operation occurs during a call, it is possible to utilize display control logic suitable for the current situation by continuously estimating and determining a change in each call position.

Probabilities (a) of a change from each state to a different state (e.g., a change between the states shown in FIG. 7) (e.g., axy, x=1, 2, 3, . . . , y=1, 2, 3, . . . ) may be utilized together, thereby automatically recognizing states for respective situations during a call. The above-recognized states may be utilized later in order to make algorithms for preventing a screen from being turned on during a call and/or for the screen to be turned on after the end of a call, and may be utilized as fundamental conditions for automatically controlling the display 310 of the electronic device 101. An example thereof is shown in FIG. 8.

Figure 8:
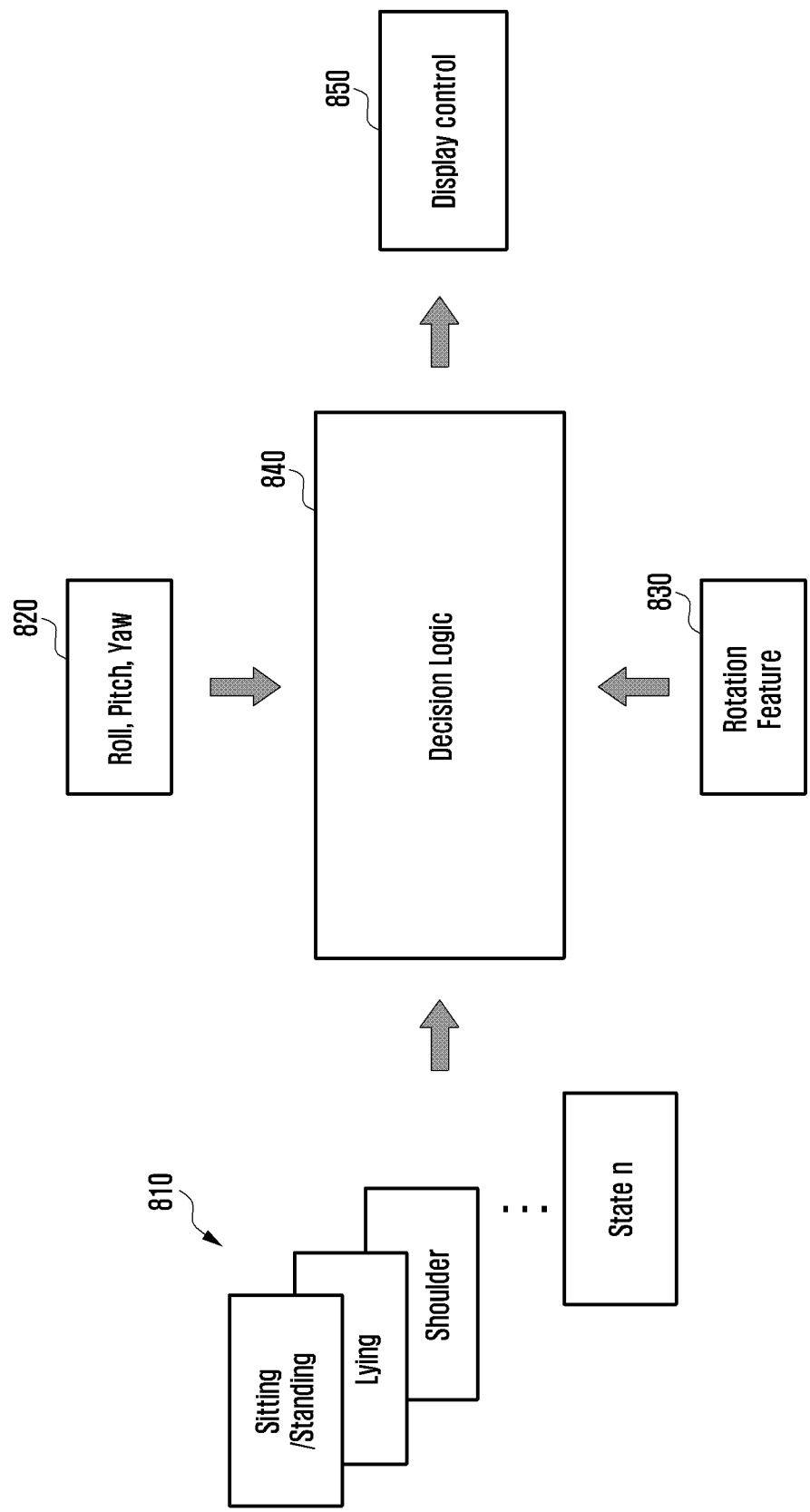
FIG. 8 is an illustration of controlling a display, based on a call state in an electronic device according to an embodiment.

FIG. 8 is a diagram of controlling a display, based on a call state in an electronic device according to an embodiment.

Referring to FIG. 8, an example of controlling an operation of the display 310 is illustrated, based on a call state determined according to auto-tracking described above with reference to FIG. 7.

The process of controlling the display 310 according to a call state may perform a complex (or comprehensive) decision using decision logic 840 in consideration of the current state of the electronic device 101, where the call status 810 is determined therethrough (e.g., sitting/standing, lying, shoulder, or state n), and where a change in the measurement value (or an output) 820 is provided from the motion sensor 330 (roll, pitch, or yaw), and/or where a rotation feature 830 of the electronic device 101 is recognized through the measurement value 820 provided by the motion sensor 330. The decision logic 840 may produce a display control signal 850 related to control of an operation of the display 310 (e.g., turning on/off the display 310), based on the determination result, and may control the operation of the display 310, based on the display control signal 850.

Figure 9A:
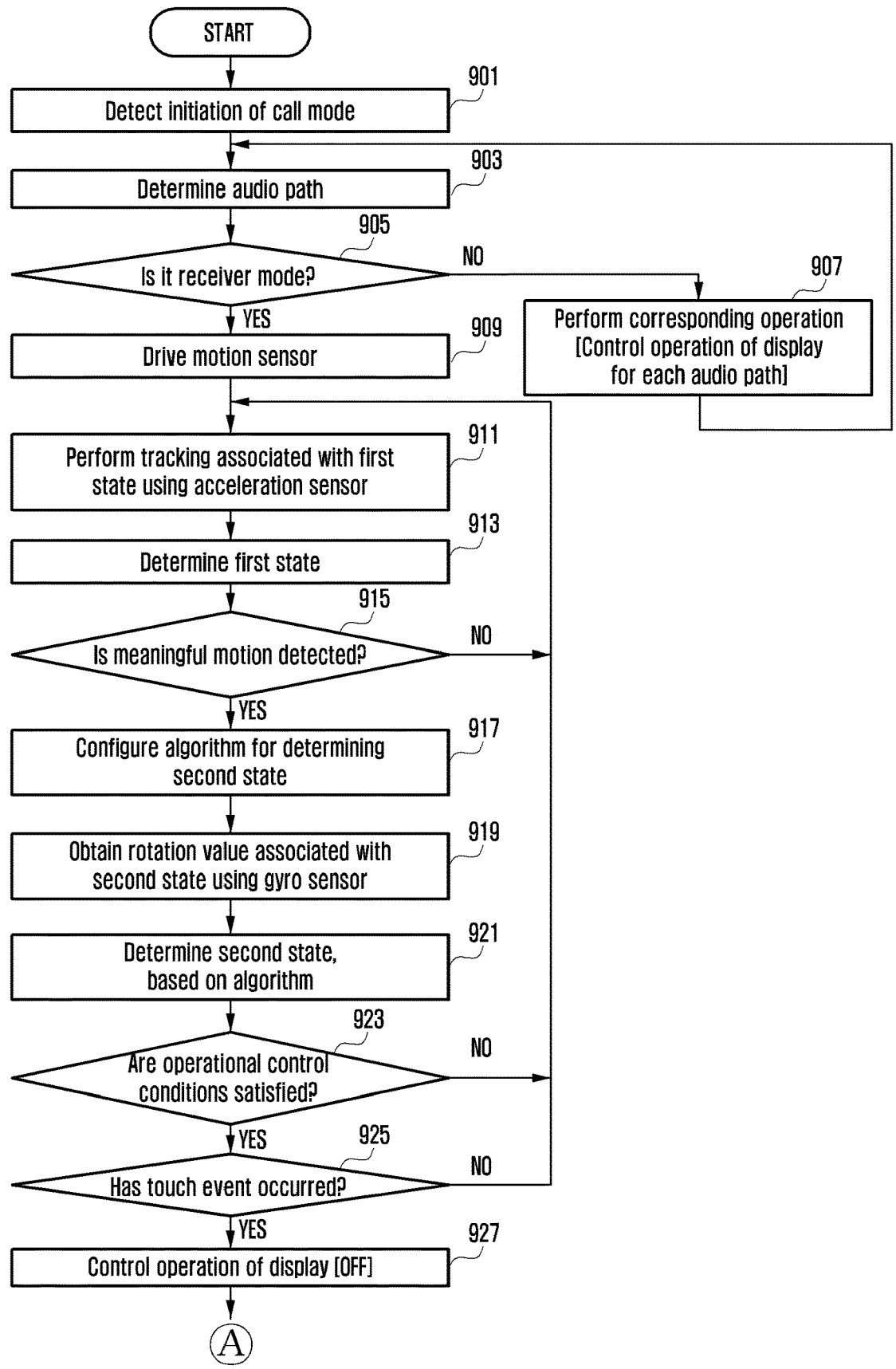
FIG. 9A is a flowchart of a method of operating an electronic device according to an embodiment.
Figure 9B:
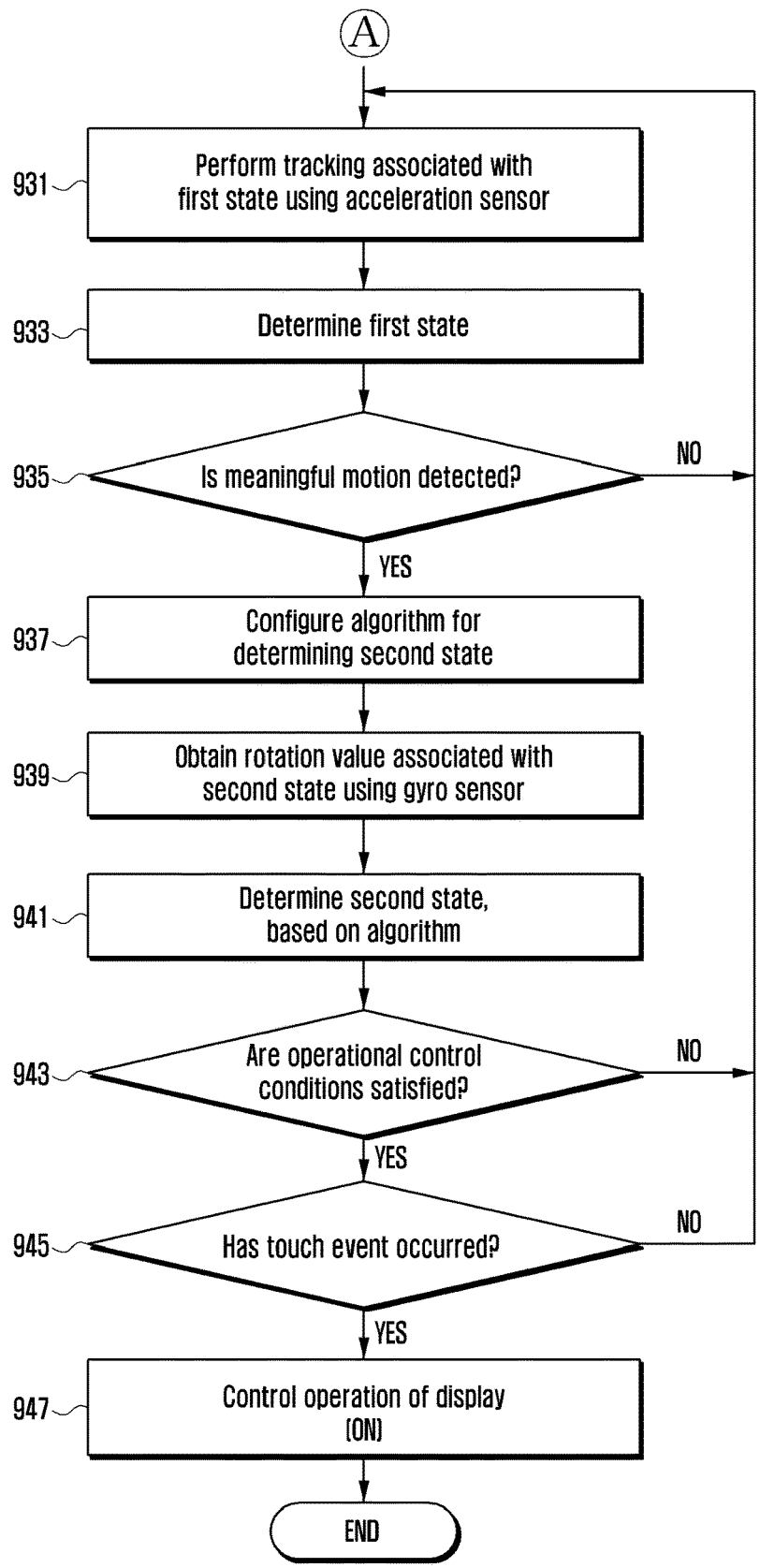
FIG. 9B is a flowchart of a method of operating an electronic device according to an embodiment.

FIGS. 9A and 9B are flowcharts of methods of operating the electronic device 101 according to an embodiment.

Referring to FIGS. 9A and 9B, in step 901, the processor 120 of the electronic device of 101 may detect an initiation of a call mode. The initiation of the call mode may include, for example, an operation of performing a call by transmitting a call, based on user input, and an operation of performing a call by receiving a call from the outside.

In step 903, the processor 120 may determine an audio path, based on the initiation of the call mode. The processor 120 may identify an audio path associated with the call mode, thereby determining whether the audio path is connected to the receiver hole 214, to the speaker hole 207, or to an external device (e.g., earphones, Bluetooth™ earphones, or a Bluetooth™ speaker) through an interface (e.g., a wired interface or a wireless interface). The processor 120 may identify a type of call mode (e.g., a receiver mode, a speaker mode, or a Bluetooth™ mode), based on the audio path. The processor 120 may check the audio path associated with the call mode before driving the motion sensor 330 (e.g., before performing auto-tracking based on the acceleration sensor 340), thereby identifying whether or not the audio path is connected to the receiver hole 214.

In step 905, the processor 120 may determine whether or not the call mode is a receiver mode, based on the result of determining the audio path.

If it is determined that the call mode is not a receiver mode in step 905 (e.g., "No" in step 905), the processor 120 may proceed to step 907 to perform a corresponding operation. The processor 120 may control the operation of the display 310, based on the corresponding call mode according to the audio path (e.g., a speaker mode and/or a Bluetooth™ mode). For example, the processor 120 in a speaker mode and/or a Bluetooth™ mode may control so as to turn on/off the display 310, based on the status in which the electronic device 101 is used (e.g., the status in which the user views the electronic device 101, the status in which the user is holding the electronic device 101 without viewing the same, or the status in which the electronic device 101 is in a pocket/bag). The processor 120 may determine the audio path while performing the corresponding operation in step 907, thereby determining whether or not the call mode is changed to the receiver mode, and may perform an operation if the call mode is changed to the receiver mode. If the corresponding operation is completed in step 907, the processor 120 may terminate the process or change the call mode to a standby mode until the user changes the call mode and proceed to step 903.

If it is determined that the call mode is a receiver mode in step 905 (e.g., "Yes" in step 905), the processor 120 may drive the motion sensor 330 in step 909. The processor 120 may detect an initiation of a call mode (or an entry into a call mode), and may drive (or activate) at least one sensor related to state sensing, such as an acceleration sensor 340 and/or a gyro sensor 350 of the motion sensor 330, while the call mode is a receiver mode.

In step 911, the processor 120 may perform tracking to determine a first state using the acceleration sensor 340. The processor 120 may track a motion of a user according to the first state, based on sensor data of the acceleration sensor 340. The processor 120 may track the first state whenever a motion of the electronic device 101 occurs, based on measurement values (e.g., acceleration values and/or gravity values) provided from the acceleration sensor 340, and may track the first state of the user (or a state change) from the beginning of the call to the end thereof (e.g., the termination of the call).

In step 913, the processor 120 may determine (or identify) a first state (e.g., a state change), based on the tracking result.

In step 915, the processor 120 may determine whether or not a meaningful motion is detected from the determined first state. The processor 120 may determine whether or not a predefined state is detected from the first state.

If no meaningful motion is detected in step 915 (e.g., "No" in step 915), the processor 120 may proceed to step 911, thereby performing step 911 and subsequent operations thereof.

If a meaningful motion is detected in step 915 (e.g., "Yes" in step 915), the processor 120 may configure an algorithm for determining a second state, based on the first state in step 917. The algorithm may be configured to correspond to the first state identified using the acceleration sensor 340, and may be a criterion for determining a second state (e.g., a gesture) using the gyro sensor 350. The processor 120 may identify a first state, based on the acceleration sensor 340, and may configure an algorithm suitable for the first state. For example, the processor 120 may configure (or reconfigure) (e.g., dynamically configure or dynamically change) an algorithm to be used in determining the second state, based on the result of determining the first state. For example, the processor 120 may dynamically configure (or change) an algorithm according to a final state (e.g., a first state decision value) determined based on auto-tracking. The processor 120 may configure an algorithm suitable for the state determined based on the motion sensor 330 (e.g., the acceleration sensor 340) (e.g., this algorithm is a reference for determining the second state and is configured using the result of the first state), and may then determine the second state (e.g., a final gesture) using the motion sensor 330, based on the configured algorithm.

In step 919, the processor 120 may obtain a rotation value (or sensor data) of the electronic device 101 associated with the second state (e.g., a rotation angle (or tilt) of the electronic device 101) using the gyro sensor 350. The processor 120 may predict (or estimate) a rotation value of the electronic device 101, based on the measurement value (e.g., an angular velocity value) provided from the gyro sensor 350, and may determine the state of the electronic device 101 (e.g., the second state), based on the predicted rotation value. The processor 120 may predict the state of the electronic device 101 by integrating the angular velocity values measured by the gyro sensor 350.

In step 921, the processor 120 may determine the second state, based on the configured algorithm. The processor 120 may determine the second state (e.g., the final state or a gesture) using the gyro sensor 350, based on the algorithm configured to correspond to the first state (e.g., the state associated with the user) determined based on the acceleration sensor 340. The processor 120 may determine the second state, based on a measurement value provided from the gyro sensor 350, and may finally determine the second state, based on the algorithm configured according to the first state (e.g., a conditional confirmation). The electronic device 101 may store an algorithm to be used in determining the second state, based at least on the first state of the user, and the processor 120 may determine the second state, based on an algorithm dynamically configured for each first state, and determine whether or not the second state conforms to the algorithm conditions.

In step 923, the processor 120 may determine whether or not operational control conditions of the display 310 (e.g., a first operation (e.g., off) control condition) are satisfied based on the result of determining the second state. The processor 120 may determine operational control conditions of the display 310, based on whether or not the second state corresponds to the state according to the algorithm configured according to the first state. If the second state conforms to the algorithm conditions, the processor 120 may determine that the operational control conditions are satisfied, and if the second state does not conform to the algorithm conditions, the processor 120 may determine that the operational control conditions are not satisfied.

In general, an operation in which the user moves the electronic device 101 from the placed position to the user's ear and an operation in which the user moves the electronic device 101 on the user's shoulder to the front of the user's eyes during a call may produce very similar measurement values (or sensor data) (e.g., the first sensor data of the acceleration sensor 340 and the second sensor data of the gyro sensor 350), which makes it difficult to distinguish therebetween. Thus, auto-tracking (or state change-detecting) may be continuously performed in a call mode in order to accurately determine the state in the above situation, thereby determining the first state. For example, the processor 120 may determine the first state corresponding to the state of the user (e.g., "state 1", "state 2", . . . ), as shown in Table 1 above, based on auto-tracking, in a call mode.

The processor 120 may adaptively (or dynamically) configure (or change) an algorithm to be used in determining the second state according to the final state (e.g., the first state) determined based on the auto-tracking. For example, the processor 120 may determine state 1, configure algorithm 1 for determining the second state, based on the determined state 1, and dynamically reconfigure algorithm 2 for determining the second state according to a state change, based on state 2 (e.g., a state change from state 1 to state 2).

The algorithm used to determine the second state may be configured (or dynamically changed) based on the first state, thereby accurately distinguishing between the operations, which make it difficult to distinguish from each other because of similar sensor data, and reducing malfunction. The processor 120 may determine the operational control conditions to be different between the second state based on algorithm 1 according to state 1 and the second state based on algorithm 2 according to state 2. For example, even in the same second state, the display operation control may differ depending on the algorithm configured according to the first state.

If the operational control conditions of the display 310 are not satisfied in step 923 (e.g., "No" in step 923), the processor 120 may proceed to step 911 to perform step 911 and subsequent operations thereof.

If the operational control conditions of the display 310 are satisfied in step 923 (e.g., "Yes" in step 923), the processor 120 may determine whether or not a touch event occurs in step 925. If the operational control conditions of the display 310 are satisfied as a result of determining the second state, based on the configured algorithm (e.g., if the second state conforms to the algorithm conditions), the processor 120 may finally determine the operational control situation of the display 310, based on a touch event provided from a touch circuit 320.

If the final state is determined using the motion sensor 330, the processor 120 may drive the touch circuit 320, and identify the current status based on a touch event provided from the touch circuit 320. For example, the processor 120 may identify whether or not the determined final state lasts with a minimal motion for a first time (e.g., about several hundred milliseconds (ms)), and may monitor whether or not a touch event is received in at least a portion (e.g., the upper portion of the display 310) of the electronic device 101 (or the display 310) within the first time.

The touch event for determining the situation in which the user puts the electronic device 101 in contact with the user's ear may generally include, for example, a multi-touch event having a plurality of touching areas or a touch occupying a large area (e.g., a surface touch or a palm touch). However, since the determination of the operational control condition of the display 310 has already been made, it is possible to determine that the electronic device 101 is in contact with the user's ear only even by a minimal touch event based on a portion (e.g., an upper portion) of the display 310 (e.g., a one-finger touch event or a one-point touch event).

If no touch event occurs in step 925 (e.g., "No" in step 925), the processor 120 may proceed to step 911, thereby performing step 911 and subsequent operations thereof.

If a touch event occurs in step 925 (e.g., "Yes" in step 925), the processor 120 may control the operation of the display 310 (e.g., turning off the display 310) in step 927. It is possible to further improve the accuracy of controlling the operation of the display 310 through a combination of the motion sensor 330 and the touch circuit 320, thereby preventing malfunction due to an unintended touch during a call. The processor 120 may perform control so as to turn off the display 310 in an on state at the time of entry into the call mode. The turning off of the display 310 may include, for example, an operation of shutting off (or turning off) the power to the display 310.

In step 931, the processor 120 may perform tracking to determine a first state using the acceleration sensor 340. The processor 120 may monitor the first state by continuously operating the acceleration sensor 340 even during a call while the display 330 is turned off.

In step 933, the processor 120 may determine (or identify) a first state (e.g., a state change), based on the tracking result. The processor 120 may monitor the first state by continuously operating the motion sensor 330 even during a call while the display 330 is turned off.

In step 935, the processor 120 may determine whether or not a meaningful motion is detected from the determined first state. The processor 120 may determine whether or not a meaningful motion is detected from the first state of the user tracked during a call while the display 310 is turned off.

If no meaningful motion is detected in step 935 (e.g., "No" in step 935), the processor 120 may proceed to step 931 to perform step 931 and subsequent operations thereof. The processor 120 may maintain the off state of the display 310.

If a meaningful motion is detected in step 935 (e.g., "Yes" in step 935), the processor 120 may configure an algorithm for determining a second state, based on the first state in step 937. The processor 120 may identify the first state, based on the acceleration sensor 340, and may configure an algorithm corresponding to the first state. For example, the processor 120 may configure (or reconfigure) (e.g., dynamically configure or dynamically change) an algorithm to be used in determining the second state, based on the result of determining the first state. For example, the processor 120 may dynamically configure (or change) an algorithm according to a final state (e.g., a first state decision value) determined based on auto-tracking.

In step 939, the processor 120 may obtain a rotation value of the electronic device 101 (or sensor data) (e.g., a rotation angle (or tilt) of the electronic device 101) associated with the second state using the gyro sensor 350. The processor 120 may predict (or estimate) a rotation value of the electronic device 101, based on the measurement value (e.g., an angular velocity value) provided from the gyro sensor 350, and may determine the state of the electronic device 101 (e.g., the second state), based on the predicted rotation value. The processor 120 may monitor the second state using the gyro sensor 350 if a meaningful motion is detected during a call while the display 330 is turned off.

In step 941, the processor 120 may determine the second state, based on the configured algorithm. The processor 120 may determine the second state (e.g., the final state or gesture) using the gyro sensor 350, based on the algorithm configured to correspond to the first state (e.g., the state associated with the user) determined based on the acceleration sensor 340. The processor 120 may determine the second state, based on a measurement value provided from the gyro sensor 350, and may finally determine the second state, based on the algorithm configured according to the first state (e.g., a conditional confirmation). The electronic device 101 may store an algorithm to be used in determining the second state, based at least on the first state of the user, and the processor 120 may determine the second state, based on an algorithm dynamically configured for each first state, and may determine whether or not the second state conforms to the algorithm conditions.

In step 943, the processor 120 may determine whether or not operational control conditions of the display 310 (e.g., second operation (e.g., on) control conditions) are satisfied based on the result of determining the second state. The processor 120 may determine operational control conditions of the display 310, based on whether or not the second state corresponds to the state according to the algorithm configured according to the first state. If the second state conforms to the algorithm conditions, the processor 120 may determine that the operational control conditions are satisfied, and if the second state does not conform to the algorithm conditions, the processor 120 may determine that the operational control conditions are not satisfied.

In general, an operation in which the user moves the electronic device 101 from the placed position to the user's ear and an operation in which the user moves the electronic device 101 on the user's shoulder to the front of his/her eyes during a call may produce very similar measurement values (or sensor data) (e.g., the first sensor data of the acceleration sensor 340 and the second sensor data of the gyro sensor 350), which makes it difficult to distinguish therebetween. Thus, auto-tracking (or state change-detecting) may be continuously performed in a call mode in order to accurately determine the state in the above situation, thereby determining the first state. For example, the processor 120 may determine the first state corresponding to the state of the user (e.g., "state 1", "state 2", . . . ), as shown in Table 1 above, based on auto-tracking, in a call mode.

The processor 120 may adaptively (or dynamically) configure (or change) an algorithm to be used in determining the second state according to the final state (e.g., the first state) determined based on the auto-tracking. For example, the processor 120 may determine state 1, may configure algorithm 1 for determining the second state, based on the determined state 1, and may dynamically reconfigure algorithm 2 for determining the second state, based on state 2 (e.g., a state change from state 1 to state 2).

The algorithm used to determine the second state may be configured (or dynamically changed) based on the first state, thereby accurately distinguishing between the operations, which make it difficult to distinguish from each other because of similar sensor data, and reducing malfunction. The processor 120 may determine the operational control conditions to be different between the second state based on algorithm 1 according to state 1 and the second state based on algorithm 2 according to state 2. For example, even in the same second state, the display operation control may differ depending on the algorithm configured according to the first state.

If the operational control conditions of the display 310 are not satisfied in step 943 (e.g., "No" in step 943), the processor 120 may proceed to step 931 to perform step 931 and subsequent operations thereof.

If the operational control conditions of the display 310 are satisfied in step 943 (e.g., "Yes" in step 943), the processor 120 may determine whether or not a touch release event occurs in step 945. If the operational control conditions of the display 310 are satisfied as a result of determining the second state, based on the configured algorithm (e.g., if the second state conforms to the algorithm conditions), the processor 120 may finally determine the operational control situation of the display 310, based on a touch release event provided from a touch circuit 320.

If the final state is determined using the motion sensor 330, the processor 120 may identify whether or not the touch event used for the control of the operation of the display 310 (e.g., turning off the display 310) is released (e.g., an occurrence of a touch release event). If both the final state and the touch release event are satisfied, the processor 120 may determine that the electronic device 101 is away from the user's ear.

If no touch event occurs in step 945 (e.g., "No" in step 945), the processor 120 may proceed to step 931, thereby performing step 931 and subsequent operations thereof.

If a touch event occurs in step 945 (e.g., "Yes" in step 945), the processor 120 may control the operation of the display 310 (e.g., turning on the display 310) in step 947. It is possible to further improve the accuracy of controlling the operation of the display 310 through a combination of the motion sensor 330 and the touch circuit 320, thereby preventing usage deterioration when the user views a screen during a call. The processor 120 may perform control so as to turn on the display 310 in an off state during a call mode. The turning on the display 310 may include, for example, an operation of supplying (or turning on) the power to the display 310.

According to an embodiment, a method of operating an electronic device includes determining a first state associated with a user using a motion sensor while performing a call mode; if a predefined state is detected from the first state, configuring an algorithm for determining a second state, based on the first state; determining the second state using the motion sensor, based on the configured algorithm; and controlling the operation of a display, based on a result of determining the second state.

Determining the first state may include driving the motion sensor based on the initiation of the call mode.

Controlling the operation of the display may include tracking a state change using first sensor data provided from an acceleration sensor of the motion sensor; determining the first state, based on the tracking result; determining whether or not a predefined state is detected from the first state; if the predefined state is detected, configuring the algorithm for determining the second state, based on the first state; determining the second state using second sensor data provided from a gyro sensor of the motion sensor; and determining whether or not the determined second state conforms to the configured algorithm.

Configuring the algorithm may include identifying a final state related to the first state; and configuring the algorithm to be used in determining the second state, based on the final state, and the method may further include determining whether or not the second state satisfies operational control conditions of the display, based on the configured algorithm; and if the second state satisfies the operational control conditions of the display, performing control so as to turn off or turn on the display.

Controlling operation of a display may include determining that the operational control conditions are satisfied if the second state conforms to the algorithm and performing control so as to turn off or turn on the display, based on the status of the display.

Tracking a state change may include tracking a state change of a user, based on a state at the beginning of the call mode, or tracking a state change of a user in a call mode, based on a previous state, using the acceleration sensor.

Determining the first state may include identifying a type of the call mode prior to driving the motion sensor, based on the initiation of the call mode; and driving the motion sensor if the type of the call mode is a receiver mode.

The method may further include driving a touch circuit before controlling the operation of the display; and determining whether or not to control the operation of the display, based on a touch event provided from the touch circuit.

The method of the electronic device may further include determining a final state when entering the call mode, based on the motion sensor; driving the touch circuit, based on determining the final state; identifying the touch event provided from the touch circuit; and performing control so as to turn off the display if the touch event is detected.

The method of the electronic device may further include determining a final state in a call mode while the display is turned off, based on the motion sensor; identifying a touch release event associated with a release of the touch event, based on determining the final state; and performing control so as to turn on the display if the touch release event is detected.

While the present disclosure has been shown and described with reference to certain embodiments thereof, the embodiments and accompanying drawings are merely presented to easily describe the present disclosure but are not intended to limit the scope of the present disclosure. Therefore, it will be understood by those skilled in the art that various changes or modifications in form and detail may be made therein without departing from the spirit and scope of the present disclosure as defined by the appended claims and their equivalents.

What is claimed is:

1. An electronic device, comprising:
   a display;
   a motion sensor comprising an acceleration sensor configured to detect a magnitude value and a gyro sensor configured to measure a change in rotation of the electronic device; and
   a processor, wherein the processor is configured to:
   determine a first state of a user using the acceleration sensor while performing a call mode;
   determine whether the determined first state corresponds to a predefined user state based on the magnitude value detected using the acceleration sensor;
   if the determined first state does not correspond to the predefined user state, maintain a first process for determining the first state of the user;
   if the determined first state corresponds to the predefined user state, identify a process for determining a second state of the user, based on the determined first state;
   determine the second state using the gyro sensor, based on the identified process, wherein the identified process is one of a second process and a third process;
   determine an operational control condition of the display based on a result of determining the second state; and
   control an operation of the display, based on the determined operational control condition,
   wherein the first process is different from the identified process, and
   wherein the processor is configured to determine the operational control conditions to be a first operation control condition when the second state is determined based on the second process and to be a second operation control condition when the second state is determined based on the third process.

2. The electronic device of claim 1, wherein the processor is further configured to drive the motion sensor, based on an initiation of the call mode.

3. The electronic device of claim 1,
   wherein the processor is further configured to:
   track a state change using first sensor data provided from the acceleration sensor;
   determine the first state according to the first process, based on a result of tracking the state change;
   determine whether the predefined user state is detected from the determined first state;
   if the predefined user state is detected, further configure the process for determining the second state, based on the first state;
   determine the second state using second sensor data provided from the gyro sensor; and
   determine the operational control condition of the display based on a result of determining the second state.

4. The electronic device of claim 3, wherein the processor is further configured to:
   identify a final state related to the first state;
   identify the process to be used in determining the second state, based on the final state;
   determine the operational control condition of the display based on a result of determining the second state; and
   perform control so as to turn off or turn on the display based on the determined operational control condition.

5. The electronic device of claim 4, wherein the processor is further configured to determine that the operational control conditions are satisfied if the second state conforms to the configured process, and perform control so as to turn off or turn on the display, based on the status of the display.

6. The electronic device of claim 3, wherein the processor is further configured to track a state change of the user, based on a state at an initiation of the call mode, or track the state change of the user in the call mode, based on a previous state, using the acceleration sensor.

7. The electronic device of claim 1, wherein the processor is further configured to:
identify a type of the call mode prior to driving the motion sensor, based on an initiation of the call mode; and
drive the motion sensor if the type of the call mode is a receiver mode.

8. The electronic device of claim 1, wherein the display comprises a touch circuit, and
wherein the processor is further configured to:
drive the touch circuit before controlling the operation of the display; and
determine whether or not to control the operation of the display, based on a touch event provided from the touch circuit.

9. The electronic device of claim 8, wherein the processor is further configured to:
determine a final state when entering the call mode, based on the motion sensor;
drive the touch circuit, based on determining the final state;
identify the touch event provided from the touch circuit; and
perform control so as to turn off the display if the touch event is detected.

10. The electronic device of claim 8, wherein the processor is further configured to:
determine a final state in the call mode while the display is turned off, based on the motion sensor;
identify a touch release event associated with a release of the touch event, based on determining the final state; and
perform control so as to turn on the display if the touch release event is detected.

11. A method of operating an electronic device, the method comprising:
determining a first state associated with a user using an acceleration sensor of a motion sensor while performing a call mode;
determining whether the determined first state corresponds to a predefined user state based on a magnitude value detected using the acceleration sensor;
if the determined first state does not correspond to the predefined user state, maintaining a first process for determining the first state of the user;
if the determined first state corresponds to the predefined user state, identifying a process for determining a second state, based on the determined first state;
determining the second state using a gyro sensor of the motion sensor, based on the identified process, wherein the identified process is one of a second process and a third process;
determining an operational control condition of the display based on a result of determining the second state; and
controlling an operation of a display, based on the determined operational control condition,
wherein the first process is different from the identified process, and
wherein the operational control conditions is determined to be a first operation control condition when the second state is determined based on the second process and to be a second operation control condition when the second state is determined based on the third process.

12. The method of claim 11, wherein determining the first state comprises driving the motion sensor, based on an initiation of the call mode.

13. The method of claim 11, wherein controlling the operation of the display comprises:
tracking a state change using first sensor data provided from the acceleration sensor of the motion sensor;
determining the first state according to the first process, based on a result of tracking the state change;
determining whether the predefined user state is detected from the determined first state;
if the predefined user state is detected, configuring the process for determining the second state, based on the first state;
determining the second state using second sensor data provided from the gyro sensor of the motion sensor; and
determining the operational control condition of the display based on a result of determining the second state.

14. The method of claim 13, wherein configuring the process comprises:
identifying a final state related to the first state; and
identifying the process to be used in determining the second state, based on the final state, and
further comprising:
determining the operational control condition of the display based on a result of determining the second state; and
performing control so as to turn off or turn on the display based on the determined operational control condition.

15. The method of claim 14, wherein controlling the operation of the display comprises determining that the operational control conditions are satisfied if the second state conforms to the configured process and performing control so as to turn off or turn on the display, based on the status of the display.

16. The method of claim 13, wherein tracking the state change comprises tracking a state change of the user, based on a state at an initiation of the call mode, or tracking the state change of the user in the call mode, based on a previous state, using the acceleration sensor.

17. The method of claim 11, wherein determining the first state comprises:
identifying a type of the call mode prior to driving the motion sensor, based on an initiation of the call mode; and
driving the motion sensor if the type of the call mode is a receiver mode.

18. The method of claim 11, further comprising:
driving a touch circuit before controlling the operation of the display; and
determining whether or not to control the operation of the display, based on a touch event provided from the touch circuit.

19. The method of claim 18, further comprising:
determining a final state when entering the call mode, based on the motion sensor;
driving the touch circuit, based on determining the final state;
identifying the touch event provided from the touch circuit; and
performing control so as to turn off the display if the touch event is detected.

20. The method of claim 18, further comprising:
determining a final state in the call mode while the display is turned off, based on the motion sensor;

identifying a touch release event associated with a release of the touch event, based on determining the final state; and performing control so as to turn on the display if the touch release event is detected.

\* \* \* \* \*